US011390473B2

(12) United States Patent
Perry-Eaton et al.

(10) Patent No.: US 11,390,473 B2
(45) Date of Patent: Jul. 19, 2022

(54) SYSTEM FOR TRANSFERRING ARTICLES FROM A CONTAINER

(71) Applicant: United States Postal Service, Washington, DC (US)

(72) Inventors: Wayne R. Perry-Eaton, Leesburg, VA (US); George W. Potts, Jr., Upper Marlboro, MD (US); Daniel Radtke, Madison, WI (US)

(73) Assignee: United States Postal Service, Washington, DC (US)

( * ) Notice: Subject to any disclaimer, the term of this patent is extended or adjusted under 35 U.S.C. 154(b) by 92 days.

(21) Appl. No.: 16/870,605

(22) Filed: May 8, 2020

(65) Prior Publication Data

US 2020/0361723 A1 Nov. 19, 2020

Related U.S. Application Data

(60) Provisional application No. 62/848,476, filed on May 15, 2019.

(51) Int. Cl.
*B65G 65/08* (2006.01)
*B65G 65/04* (2006.01)
(Continued)

(52) U.S. Cl.
CPC .............. *B65G 65/04* (2013.01); *B07C 3/008* (2013.01); *B65G 65/38* (2013.01); *B65G 2207/46* (2013.01)

(58) Field of Classification Search
CPC ...................... B65G 65/08; B65H 2301/42242
(Continued)

(56) References Cited

U.S. PATENT DOCUMENTS 4,577,852 A * 3/1986 Grunder ................. G06M 7/10
271/189
5,252,024 A * 10/1993 Breda ................. B65G 47/901
414/222.03
(Continued)

FOREIGN PATENT DOCUMENTS

DE 10 2012 2199912 A1 4/2014
FR 2 706 331 A1 12/1994
WO WO 99/20530 A1 4/1999

OTHER PUBLICATIONS

International Search Report and Written Opinion dated Dec. 11, 2018 in International Application No. PCT/US2018/049762 filed Sep. 6, 2018.
(Continued)

*Primary Examiner* — Joseph A Dillon, Jr.
(74) *Attorney, Agent, or Firm* — Knobbe, Martens, Olson & Bear, LLP

(57) ABSTRACT

An automated system for transferring articles from a container. An item transfer system includes a frame configured to receive a first tray and a second tray, a movable paddle assembly, a frame, and a plurality of actuators. The system is configured to transfer articles from the first tray to the second tray by an automated process including securing the articles within the first tray with the paddle assembly, moving a lifting assembly or an item support platform such that the articles are in a slidable configuration relative to the first tray, moving the paddle assembly and/or the item support platform in one or more linear translations to remove the items from the first tray and place the items above the second tray, and releasing the items into the second tray.

13 Claims, 24 Drawing Sheets

(51) Int. Cl.
   *B07C 3/00* (2006.01)
   *B65G 65/38* (2006.01)

(58) Field of Classification Search
   USPC ...................................................... 414/790.2
   See application file for complete search history.

(56) References Cited

U.S. PATENT DOCUMENTS

| | | | |
|---|---|---|---|
| 5,271,710 A | 12/1993 | Decharran et al. | |
| 5,299,793 A * | 4/1994 | Couturier | B65H 31/32 |
| | | | 493/450 |
| 5,906,468 A | 5/1999 | Vander Syde et al. | |
| 5,993,132 A * | 11/1999 | Harres | B65H 1/30 |
| | | | 414/811 |
| 6,217,274 B1 | 4/2001 | Svyatsky et al. | |
| 7,112,031 B2 * | 9/2006 | Harres | B07C 3/008 |
| | | | 414/281 |
| 7,544,038 B2 * | 6/2009 | Gerding | B65G 60/00 |
| | | | 414/794.9 |
| 7,553,119 B2 | 6/2009 | Good et al. | |
| 7,572,094 B2 | 8/2009 | Miskiewicz et al. | |
| 7,866,936 B2 | 1/2011 | Schuck et al. | |
| 7,980,383 B2 * | 7/2011 | Doepker | B65G 47/82 |
| | | | 198/465.1 |
| 8,141,133 B2 | 3/2012 | Pagan | |
| 8,142,133 B2 | 3/2012 | Neebe et al. | |
| 8,172,498 B2 | 5/2012 | Enenkel | |
| 8,807,912 B2 * | 8/2014 | Liebheit | B65G 61/00 |
| | | | 414/788.9 |
| 9,546,009 B2 * | 1/2017 | Hagelqvist | B65B 31/028 |
| 10,167,150 B2 * | 1/2019 | Gugel | B65H 3/242 |
| 10,233,039 B2 * | 3/2019 | Miyoshi | B65G 63/00 |
| 10,889,440 B2 | 1/2021 | Perry-Eaton et al. | |
| 2009/0087295 A1 * | 4/2009 | Fritzsche | B65G 47/90 |
| | | | 414/790.2 |
| 2010/0290867 A1 | 11/2010 | Nice et al. | |
| 2013/0247524 A1 | 9/2013 | Ford et al. | |
| 2020/0130933 A1 * | 4/2020 | Mattern | B25J 19/0054 |
| 2020/0338755 A1 * | 10/2020 | Behringer | B65G 47/91 |
| 2021/0074111 A1 * | 3/2021 | Sperl | G07D 11/40 |
| 2021/0130093 A1 * | 5/2021 | Perry-Eaton | B65G 1/137 |

OTHER PUBLICATIONS

International Preliminary Report on Patentability dated Mar. 19, 2020 in International Application No. PCT/US2018/049762 filed Sep. 6, 2018.

\* cited by examiner

SYSTEM FOR TRANSFERRING ARTICLES FROM A CONTAINER

CROSS-REFERENCE TO RELATED APPLICATIONS

This application claims the benefit of U.S. Provisional Application No. 62/848,476, filed May 15, 2019, titled "SYSTEM FOR TRANSFERRING ARTICLES FROM A CONTAINER," which is hereby incorporated by reference in its entirety.

FIELD

This disclosure relates to systems and methods for transfer of items between a first tray and a second tray.

DESCRIPTION OF THE RELATED TECHNOLOGY

Items, such as letters, envelopes, postcards, etc., may be received, transported, transferred, processed, collected, sorted, or the like, in containers such as trays. Items may be contained in different types of trays at various stages of transport and processing.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment of the systems and methods disclosed herein, a tray content transfer system is described. The tray content transfer system comprises a frame comprising a first tray sub-frame coupled to the frame and configured to receive a first tray and a second tray sub-frame coupled to the frame and configured to receive a second tray at a location spaced from the first tray along a longitudinal axis; a paddle assembly movably coupled to the frame, the paddle assembly comprising a plurality of paddles, wherein the distance between the paddles is adjustable to selectively engage and release one or more items in the first tray, and wherein the paddle assembly is movable relative to the frame along a first axis parallel to the longitudinal axis and a second axis perpendicular to the first linear axis; a lifting assembly movably coupled to the frame, the lifting assembly comprising one or more lifting elements, wherein the lifting assembly is configured to lift the one or more items in the first tray by moving vertically along a third axis parallel to the second axis such that the one or more lifting elements pass at least partially through openings in a floor of the first tray; and an item support platform movably coupled to the frame, the item support platform comprising a substantially planar surface movable along a fourth axis parallel to the first axis between a first position above the first tray sub-frame and a second position above the second tray sub-frame.

In some embodiments, the tray content transfer system further comprises a controller configured to adjust the distance between the paddles, to move the paddle assembly along the first axis and the second axis, to move the lifting assembly along the third axis, and to move the item support platform along the fourth axis, in a predetermined sequence to transfer the one or more items from the first tray to the second tray. The predetermined sequence comprises: while the item support platform is not in the first position, causing the paddle assembly to engage the one or more items within the first tray; moving the paddle assembly upward along the second axis and moving the lifting assembly upward along the third axis to a raised position in which the items are disposed higher than a top of the first tray; moving the item support platform to the first position such that the item support platform is disposed between the one or more lifting elements and the items; simultaneously moving the paddle assembly along the first axis and moving the item support platform along the fourth axis such that the item support platform is in the second position and the paddle assembly is disposed above the second tray; and moving the item support platform along the fourth axis away from the second position to release the one or more items into the second tray. In some embodiments, the tray content transfer system further comprises a sensor configured to detect the presence of the first tray or the second tray within the tray content transfer system, wherein the plurality of motors are configured to initiate the predetermined sequence based at least in part on detecting the presence of the first tray or the second tray.

In some embodiments, each paddle comprises a plurality of paddle fingers sized and shaped to enter one or more corresponding grooves within a sidewall of the first tray when the paddle assembly is lowered into the first tray. In some embodiments, the tray content transfer system further comprises one or more rails coupled to the frame parallel to the longitudinal axis at a height that retains the one or more items on the item support platform. In some embodiments, the tray content transfer system further comprises a conveyor coupled to the first tray sub-frame or the second tray sub-frame, the conveyor configured to move a first tray or a second tray along the frame parallel to the longitudinal axis. In some embodiments, the item support platform is further movable along the fourth linear axis to a disengaged position in which the item support platform is disposed above neither the first tray nor the second tray.

In another embodiment of the systems and methods disclosed herein, a tray content transfer system is described. The tray content transfer system comprises a frame comprising a first tray sub-frame coupled to the frame and configured to receive a first tray and a second tray sub-frame coupled to the frame and configured to receive a second tray at a location spaced from the first tray along a longitudinal axis, the second tray sub-frame disposed lower relative to the first tray sub-frame; a paddle assembly movably coupled to the frame, the paddle assembly comprising a plurality of paddles, a first paddle of the plurality of paddles configured to grasp the first sidewall and detach a removable sidewall from the first tray, wherein the distance between the paddles is adjustable to selectively engage and release one or more items in the first tray, and wherein the paddle assembly is movable relative to the frame along a first axis parallel to the longitudinal axis and a second axis perpendicular to the first axis; and an item support platform movably coupled to the frame, the item support platform comprising a substantially planar surface movable along a third axis parallel to the first axis between at least a first position above the second tray sub-frame and a second position in which the item support platform is not above the second tray sub-frame.

In some embodiments, the tray content transfer system further comprises a controller configured to adjust the distance between the paddles, to move the paddle assembly along the first axis and the second axis, and to move the item support platform along the third axis, in a predetermined sequence to transfer the one or more items from the first tray to the second tray. The predetermined sequence comprises moving the paddle assembly to engage the one or more items within the first tray; moving the first paddle to detach the removable sidewall from the first tray; moving the item support platform to the first position such that the item support platform is disposed above the second tray sub-frame and at least one of adjacent to or partially beneath the first tray proximate the first sidewall; moving the paddle assembly along the first axis to slide the one or more items from the first tray onto the item support platform, the one or more items retained between the detached removable sidewall and a second paddle of the plurality of paddles; and moving the item support platform along the fourth axis to the second position to release the one or more items into the second tray. In some embodiments, the tray content transfer system further comprises a sensor configured to detect the presence of the first tray or the second tray within the tray content transfer system, wherein the plurality of motors are configured to initiate the predetermined sequence based at least in part on detecting the presence of the first tray or the second tray.

In some embodiments, a second paddle of the plurality of paddles comprises a plurality of paddle fingers sized and shaped to enter one or more corresponding grooves within a sidewall of the first tray when the paddle assembly is lowered into the first tray. In some embodiments, the tray content transfer system further comprises one or more rails disposed parallel to the longitudinal axis at a height that retains the one or more items on the item support platform. In some embodiments, the tray content transfer system further comprises a conveyor coupled to the first tray sub-frame or the second tray sub-frame, the conveyor configured to move a first tray or a second tray along the frame parallel to the longitudinal axis. In some embodiments, the item support platform is further movable along the fourth axis to a disengaged position in which the item support platform is disposed above neither the first tray nor the second tray.

In another embodiment of the systems and methods disclosed herein, a method for transferring items from a tray is described. The method comprises, by an automated process, receiving a first tray containing one or more items at a first location within a tray content transfer system; receiving a second tray within the tray content transfer system at a second location spaced along a longitudinal axis from the first location; securing the one or more items relative to the first tray; moving an item support platform parallel to the longitudinal axis and moving either a portion of the first tray or the one or more items, such that the one or more items are in a slidable configuration relative to the first tray; moving the one or more items along the longitudinal axis such that the one or more items rest on the item support platform above the second tray; and moving the item support platform parallel to the longitudinal axis to release the one or more items into the second tray.

In some embodiments, securing the one or more items comprises moving a paddle assembly downward into the first tray such that the one or more items are disposed between a plurality of paddles of the paddle assembly, and engaging the one or more items between the plurality of paddles, wherein the one or more items remain engaged between the plurality of paddles until the one or more items are released into the second tray. In some embodiments, moving either a portion of the first tray or the one or more items comprises detaching a detachable sidewall from the first tray. In some embodiments, moving either a portion of the first tray or the one or more items comprises lifting the one or more items out of the first tray by a lifting assembly. In some embodiments, the method is initiated based at least in part on a detection of the presence of the first tray or the second tray within the tray content transfer system. In some embodiments, the first tray is an automation-compatible tray and the second tray is not an automation-compatible tray.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
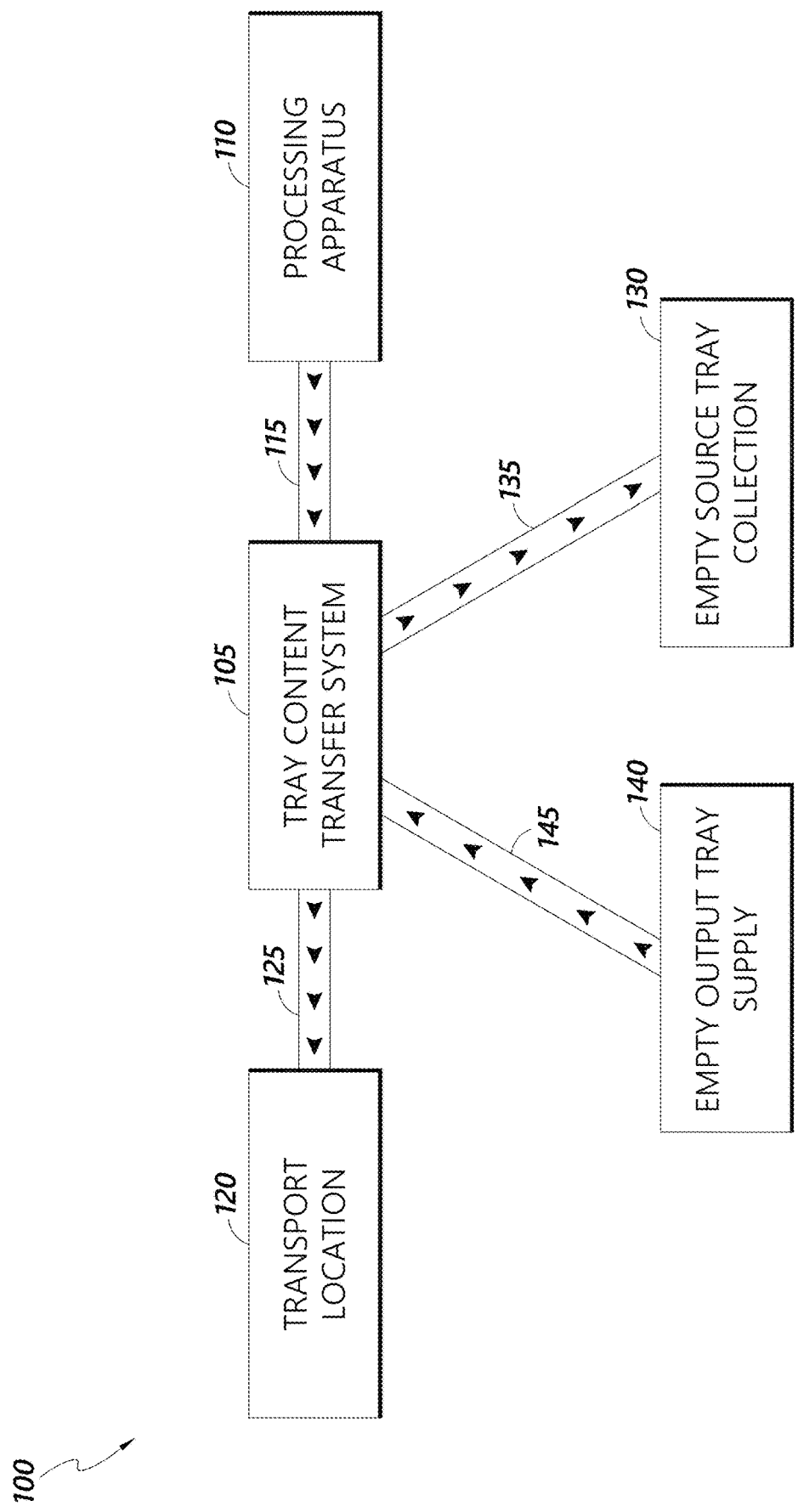
FIG. 1 is a schematic illustration of an example item processing system including a tray content transfer system.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

In processing items in a distribution network, items can be transported in containers, such as trays. Items such as letters, postcards, envelopes, or other stackable items may be received, transported, and processed in trays. In some item processing implementations, two or more different types of trays may be used. When items are processed at a processing facility, a first type of tray may be optimized for for use in automated processes and with automated processing equipment. For example, a first type of tray may be configured to be compatible with automated processing machinery at the processing facility (e.g., may have structural features designed to interact with particular processing machines and/or may be more rigid or dimensionally stable to facilitate automated processing of items). When the items have been processed and are ready to be transported outside of the facility, they may be placed into a second type of tray which may be flexible, lightweight, inexpensive to manufacture, sized and shaped to fit in an item collection system, or the like), such as on an aircraft. Thus, items received in the first type of tray may need to be transferred to the second type of tray after they are processed and before being transported away from the facility.

Transferring items between trays such as from rigid automation-friendly processing trays to soft-sided transport trays can be performed manually. Manual transfer of items from a first tray to a second tray can be time-consuming and imprecise. Items may be dropped while being manually transferred, for example, while an operator is moving a horizontally oriented stack of letters by exerting an inward pressure on the ends of the stack. In another example, items such as letters may be received in a uniformly faced arrangement, and operator error during transfer may cause some of the letters to face the opposite direction after transfer, resulting in processing errors or delays.

Some aspects of the tray content transfer systems disclosed herein are configured to provide an automated process for transferring items from a first tray to a second tray. In some embodiments, the tray content transfer systems may transfer items more reliably, efficiently, cost-effectively, and/or quickly than existing manual methods of tray content transfer. Although the present disclosure describes tray content transfer systems in the context of trays and flat items such as letter mail, it will be understood that other containers and items can be used without departing from the scope of the present disclosure.

Generally described, embodiments of the systems described herein use a sequence of motions to reliably and efficiently transfer items between a source tray, such as a rigid tray suited for use with machine processing of the items, and an output tray, such as a corrugated plastic, or letter tray, or other type of tray. For example, the items may be transferred from an automation-compatible tray to an output tray that is not an automation-compatible tray. In some embodiments, a loaded source tray and an empty output tray are placed within a tray content transfer system. A mail enclosure assembly descends to a position partially within the loaded source tray, such that the contents of the source tray are secured within the source tray. The tray content transfer system then moves the items and/or the source tray to a slidable configuration, such as by lifting the items and placing a platform or slide beneath the items, or by removing an end wall of the source tray. The items are then moved laterally to a position displaced vertically above the empty output tray. The slide or other platform supporting the items can be translated laterally while the items are laterally retained, to release the contents into the output tray. The transfer sequences disclosed herein can allow the transfer system to move articles such as letters, flats, parcels, and the like. In some embodiments, the system described herein can advantageously move items from a first tray to a second tray without lifting or suspending the articles over a space, gap, or area between the trays, where articles may be lost or damaged if dropped.

FIG. 1 schematically illustrates an example item processing system 100 including a tray content transfer system 105. The item processing system 100 further includes a processing apparatus 110, a transport location 120, an empty source tray collection 130, and an empty output tray supply 140. Trays can be transferred between the components of the item processing system 100 by an intake flow path 115, an output flow path 125, an empty source tray flow path 135, and an empty output tray flow path 145. Each of the flow paths 115, 125, 135, 145 can be a conveyor, such as a moving conveyor belt surface, a series of rollers, or any other conveying system configured to move one or more trays laterally and/or vertically.

The processing apparatus 110 can include one or more devices or systems for processing the items before tray content transfer. For example, the processing apparatus 110 can include any number of machines, such as mail processing equipment, configured to scan, image, weigh, measure, sort, order, combine, separate, analyze, or otherwise process the items. In some letter mail processing embodiments, the processing apparatus 110 can include one or more machines for automatically reading information provided on the letters (e.g., postage information, destination address, return address, etc.) and/or sorting the letters for further transportation according to item type and/or destination, or other criteria.

The transport location 120 can include one or more devices or systems for receiving item-containing output trays. For example, the transport location 120 can include an input of a loading dock, palletizer, container, etc. where item-containing trays are distributed to transport vehicles for transport away from the processing facility. In some embodiments, the transport location 120 can be an input of another process to be performed after tray content transfer. For example, in some letter mail processing embodiments, the transport location 120 may include a sorter/sequencer system configured to sort the letters into stop groups and sequence the letters into delivery sequence order.

The empty source tray collection 130 and empty output tray supply 140 can include one or more lines, piles, stacks, carts, dispensers, receivers, or other structures capable of holding a plurality of trays. For example, the empty source tray collection 130 may include a tray receiving system located at an end of the empty source tray flow path 135 for receiving and stacking or otherwise organizing empty source trays to be reused for transporting additional items. The empty output tray supply 140 can include one or more stacks, dispensers, or the like, for placing empty output trays into the empty output tray flow path 145 for delivery to the tray content transfer system 105.

In an example method of operation, the tray content transfer system 105 receives an item-containing automation-compatible source tray from the processing apparatus 110 via the intake flow path 115, and receives an empty output tray from the empty output tray supply 140 via the empty output tray flow path 145. At the tray content transfer system 105, the items in the source tray are transferred from the source tray to the empty output tray. After the transfer, the output tray contains the items previously received in the source tray. The item-containing output tray is then sent to the transport location 120 via the output flow path 125. The empty source tray is sent to the empty source tray collection 130 via the empty source tray flow path 135. After the source tray and output tray leave the tray content transfer system 105, the example method can be repeated with a second item-containing source tray and a second empty output tray.

The example method described above with reference to FIG. 1 can be repeated any number of times or indefinitely, for example, based on a desired number or rate of item-containing source trays received for processing. In some embodiments, the tray content transfer system 105 can be configured to transfer the contents of two or more source trays to a single output tray, to transfer the contents of a single source tray to two or more output trays, or to transfer the contents of two or more source trays to two or more output trays simultaneously. In addition, various components of the item processing system 100 can be automated and/or performed manually. For example, any of the flow paths 115, 125, 135, 145 can be performed manually at least in part, such as by an operator manually placing one or more loaded or empty trays onto a conveyor or directly into the tray content transfer system 105.

Figure 2A:
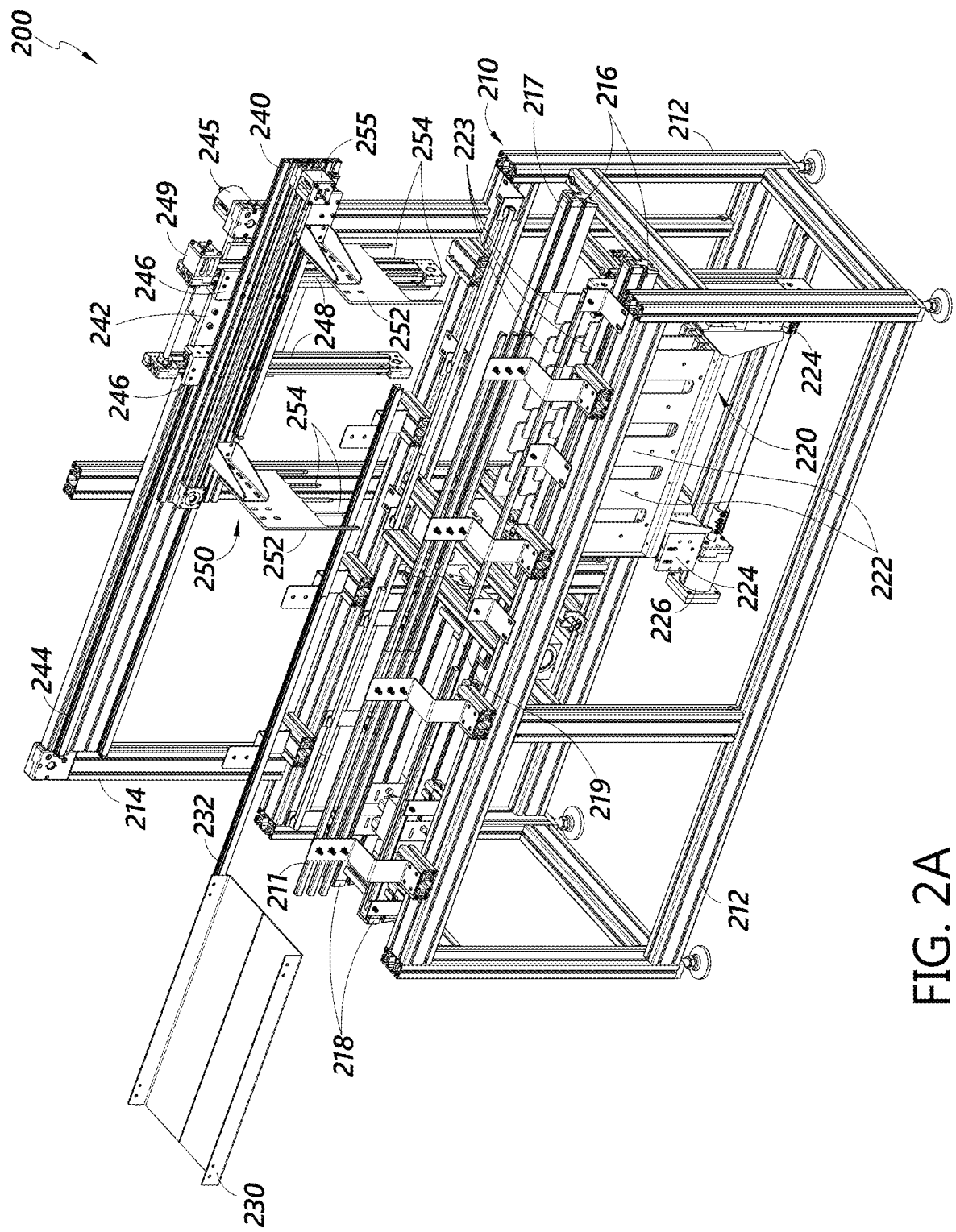
FIG. 2A is a front perspective view of an example tray content transfer system.
Figure 2B:
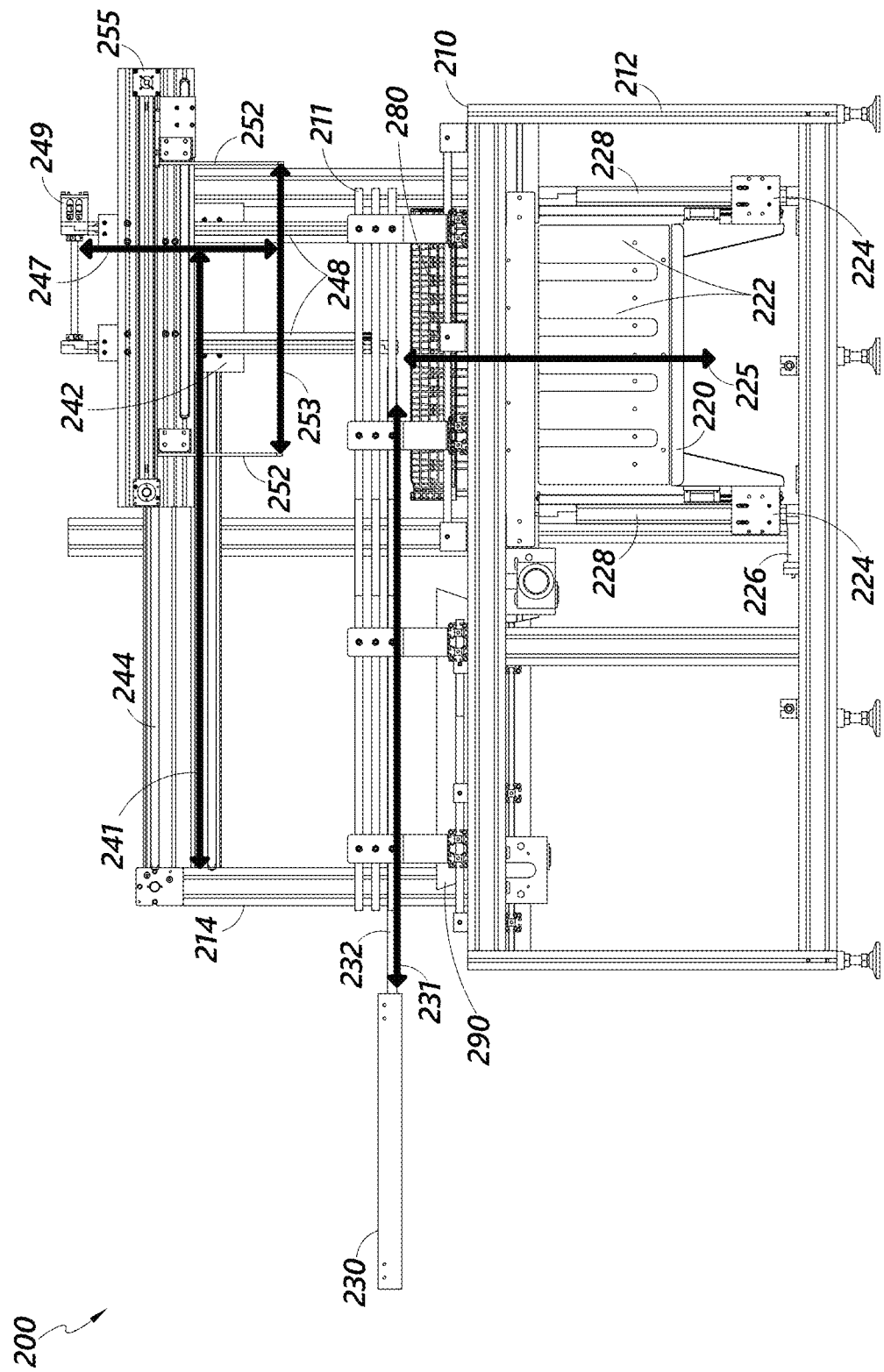
FIG. 2B is a front elevation view of the tray content transfer system of FIG. 2A showing the axes of motion of the tray content transfer system.
Figure 2C:
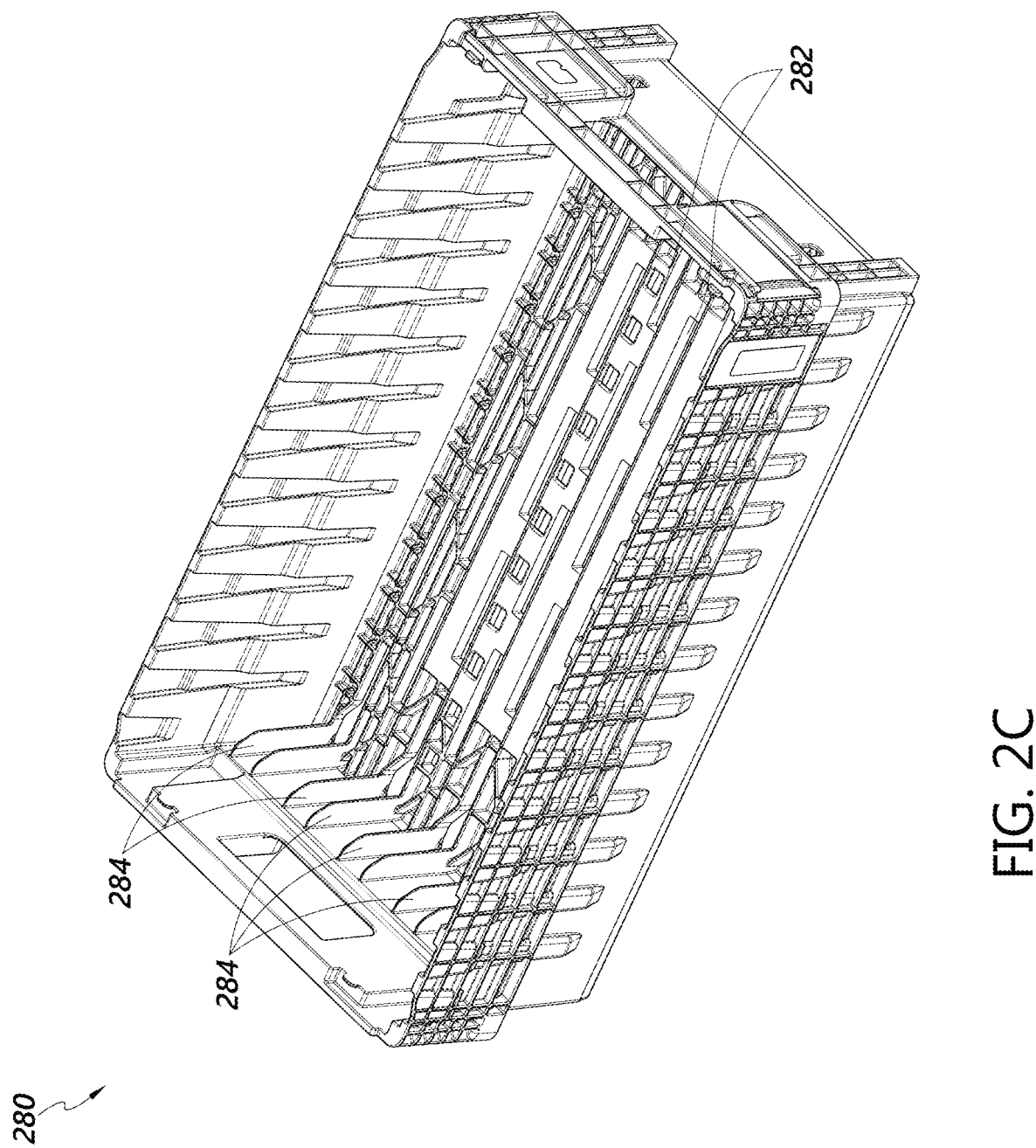
FIG. 2C is a perspective view of an example source tray compatible with the tray content transfer system of FIGS. 2A and 2B.

FIGS. 2A and 2B depict a tray content transfer system 200 in accordance with an example embodiment. FIG. 2A is a front perspective view of the tray content transfer system 200 in an empty state. FIG. 2B is a front elevation view of the tray content transfer system 200 containing a source tray 280 and an output tray 290, illustrating five axes of motion within the tray content transfer system 200. FIG. 2C depicts an example source tray 280 compatible with the tray content transfer system 200. The tray content transfer system 200 generally includes a frame 210, a lifting assembly 220 movably mounted at least partially within the outer frame 210, an item support platform 230, and a paddle assembly 250 movably mounted above the frame 210.

The frame 210 is generally configured to provide a stable support for the lifting assembly 220, the item support platform 230, and the paddle assembly 250. The frame 210 includes various structural members 212 arranged to form a substantially rigid frame structure, upper frame members 214, a source tray sub-frame 216, an output tray sub-frame 218, and one or more rails 211 positioned to laterally confine items being transferred. In some embodiments, the source tray sub-frame 216 includes one or more source tray conveyors 217 configured to slide a source tray 280 when the source tray 280 is at least partially on the source tray conveyors 217. The output tray sub-frame 218 may similarly include one or more output tray conveyors 219 configured to slide an output tray 290 when the output tray 290 is at least partially on the output tray conveyors 219. The source tray conveyors 217 and the output tray conveyors 219 may be reversible, for example, so that they can travel in a first direction before a transfer to pull a source tray 280 and/or an output tray 290 from an external conveyor system (e.g., an automated tray transport system or the like) into a suitable position within the tray content transfer system 200, and can travel in a second direction after completing a transfer to push the source tray 280 and/or the output tray 290 back out to the external conveyor system. In various embodiments, the frame 210 can be any size, shape, or configuration suitable to support the various components of the tray content transfer system 200. For example, the frame 210 can be built into a wall, a shelf, a floor, or the like, and need not be a free-standing rectangular frame as shown in the figures.

The upper frame members 214 of the frame 210 are generally configured to support and accommodate motion of a paddle assembly base 240 to which the paddle assembly 250 is mounted. A horizontal translation platform 242 is slidably mounted to a horizontal track member 244 disposed on the upper frame members 214, to accommodate horizontal movement of the paddle assembly 250. A vertical translation platform 246 is slidably mounted to two vertical track members 248 of the horizontal translation platform 242 to accommodate vertical movement of the paddle assembly 250. Movement of the horizontal translation platform 242 along the horizontal track member 244 and movement of the vertical translation platform 246 along the vertical track members 248 can occur independently, and may be controlled by one or more motors, such as a horizontal paddle assembly motor 245 and a vertical paddle assembly motor 249.

The lifting assembly 220 is configured to move vertically to lift items within a source tray 280. Thus, the lifting assembly 220 includes an array of fingers 222 sized and shaped to fit within corresponding slots 282 in the floor of the source tray 280 (FIG. 2C). The lifting assembly 220 further includes vertical sliders 224 mounted on vertical tracks 228. When the lifting assembly 220 is to be raised, the vertical sliders 224 can be driven upward along the vertical tracks 228, for example, by one or more motors such as a lifting assembly motor 226, applying a generally upward force on the horizontal sub-frame 222. As the lifting assembly 220 travels upward, the tips 223 of the fingers 222 enter the slots 282, passing through the floor of the source tray 280 to lift any items resting within the source tray 280. The lifting assembly 220 may have a maximum range of vertical motion, for example, defined between the positions of the lifting assembly 220 when the vertical sliders 224 are at the bottom and top ends of the vertical tracks 228.

Figure 6:
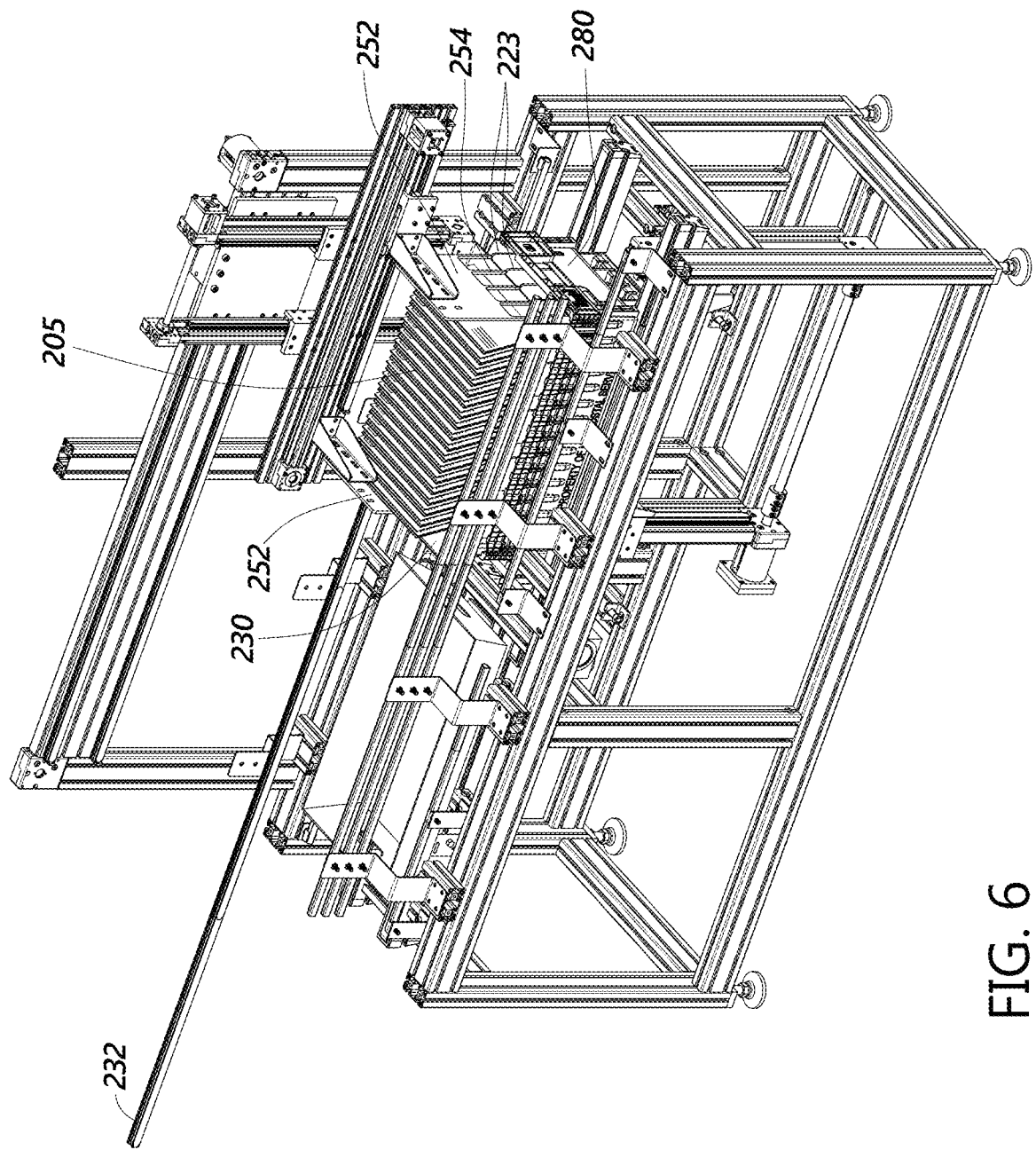
FIG. 6 is a perspective view of a fourth state of the tray content transfer system of FIG. 3 during the example tray content transfer process of FIGS. 3-5.

The item support platform 230 is configured to move horizontally along a track 232 disposed above the source tray sub-frame 216 and the output tray sub-frame 218. The track 232 may be mounted at an appropriate height such that the item support platform 230 can slide along the length of the track 232 unobstructed while a source tray 280 and an output tray 290 are located within the tray content transfer system 200. For example, in some embodiments the item support platform 230 is disposed at a predetermined height such that the item support platform 230 is slightly above the tips 223 of the fingers 222 (e.g., between ⅛ inch and 1 inch, such as ¼ inch, ½ inch, etc., above the tips 223) when the lifting assembly 200 is in its highest position. The track 232 may provide a sufficient range of motion for the item support platform 230 such that the item support platform 230 can slide between a first extreme position (e.g., the disengaged position as shown in FIG. 2A in which the item support platform 230 is not above either the source tray sub-frame 216 or the output tray sub-frame 218), and a second extreme position (e.g., the position as shown in FIG. 6 in which the item support platform 230 is above the source tray sub-frame 216). In an intermediate position between the first and second extreme positions (e.g., the intermediate position shown in FIG. 7), the item support platform 230 is disposed above the output tray sub-frame 218. In some embodiments, the item support platform 230 may comprise two or more pieces that are movable relative to each other. For example, the item support platform 230 may comprise two halves divided along a dimension of the item support platform 230 such that the item support platform 230 can open by rotating in a "bomb bay doors" configuration or by sliding outwardly.

The paddle assembly 250, as shown in FIGS. 2A-2B, includes two paddles 252, each paddle including a plurality of paddle fingers 254. The paddle assembly 250 can be made of any substantially rigid material, for example, a metal such as sheet aluminum or steel, a hard plastic, or the like. One or more of the paddles 252 are slidably mounted on the paddle assembly base 240. A paddle motor 255 may slide the paddles 252 to increase or decrease the distance between the paddles 252.

Each paddle 252 is a generally planar surface disposed perpendicular to the paddle assembly base 240. The paddles 252 include paddle fingers 254 spaced along the paddles 252 and generally extending downward from the paddles 252. The paddle fingers 254 can be sized and shaped to fit within corresponding grooves between spacers 284 of a source tray 280. As shown in FIG. 2C, the spacers 284 extend from the sidewalls of the source tray 280 to maintain a space between the sidewalls and any items within the source tray 280. As will be described in greater detail with reference to FIGS. 3-9, the spacers 284 allow the paddle fingers 254 to slide downward into the space between each sidewall and any items in the source tray 280 such that the items can be contained between the paddles 252 and/or paddle fingers 254. In various embodiments, the paddles 252 can have other sizes and/or shapes to conform with source trays 280 of any size or shape.

With reference to FIG. 2B, the components described above with reference to FIGS. 2A-2C can move along various axes with reference to the frame 210. The paddles 252 of the paddle assembly 250 can be moved along several axes. Horizontal translation along a paddle assembly horizontal axis 241 can be achieved by moving the horizontal translation platform 242 along the horizontal track member 244 under control of the horizontal paddle assembly motor 245. Vertical translation along a paddle assembly vertical axis 247 can be achieved by moving the vertical translation platform 246 along the vertical track members 248 under control of the vertical paddle assembly motor 249. Squeezing of the paddles 252 along a paddle motion axis 253 can be achieved by moving one or both paddles 252 by the paddle motor 255. Vertical translation of the lifting assembly 220 along a lifting assembly axis 225 can be achieved by moving the vertical sliders 224 along the vertical tracks 228 under control of the lifting assembly motor 226. An item support motor (not shown) can move the item support 230 along an item support axis 231. A combination of movements along axes 231, 233, 237, 247, and 253 can be used to transfer items from the source tray 280 to the process tray 290.

Referring generally to FIGS. 2A and 2B, motion of any of the moving parts described herein, for example, horizontal translation along axes 231, 241, and 253, and/or vertical translation along axes 225 and 247, can be driven by any number of motors, electromechanical, pneumatic, etc., and can be selectively controlled and/or inhibited by mechanical or pneumatic brakes configured to stop and/or prevent motion along any of the movement axes described herein. The motors and/or brakes can be controlled by one or more controllers, which may include computer components such as one or more processors, memory or other storage media, network or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence. The predetermined sequence can include, for example, a tray content transfer process such as the process described below with reference to FIGS. 3-9.

FIGS. 3-9 sequentially illustrate an example process for transferring the contents of a source tray 280 to an output tray 290. Although the process of FIGS. 3-9 is shown and described in the context of the tray content transfer system 200 depicted in FIGS. 2A and 2B, it will be appreciated that the same or similar steps may be implemented in any other tray content transfer system.

Figure 3:
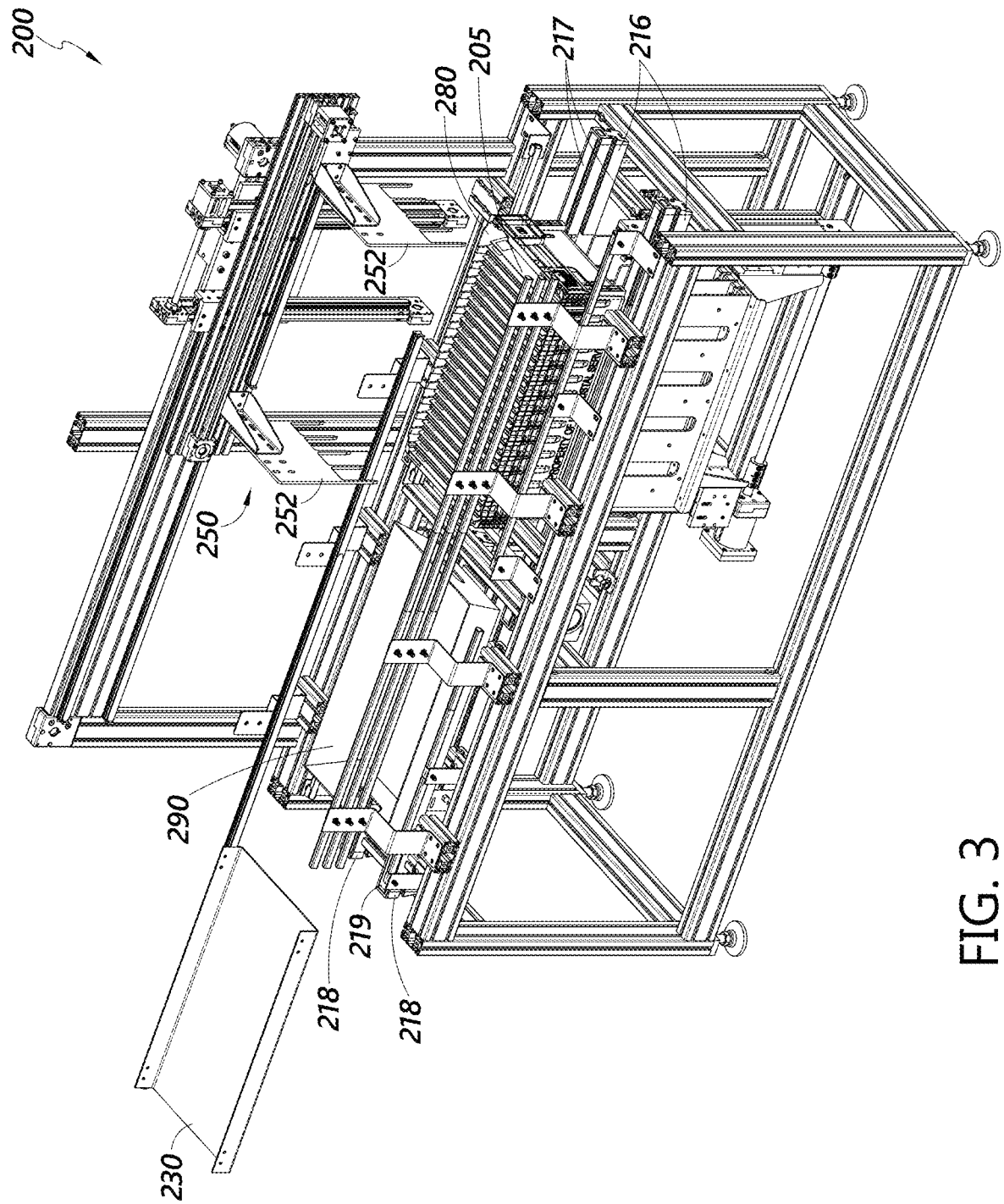
FIG. 3 is a perspective view of an initial state of a tray content transfer system during an example tray content transfer process.

FIG. 3 depicts an initial state of the tray content transfer process. In the initial state, a source tray 280 contains items 205. The items can be, for example, letters, flats, etc. In the initial state of FIG. 3, the source tray 280 has been placed onto the source tray sub-frame 216 in a position below the paddle assembly 250. An empty output tray 290 has been placed in the output tray sub-frame 218 spaced from the source tray 280 to receive the items 205 through the tray content transfer process. As described above with reference to FIG. 1, the source tray 280 and the output tray 290 may have been placed in their respective locations manually or automatically, for example, being placed into the tray content transfer system 200 by one or more conveyors, rollers, ramps, robotic arms, paddles, pushers, or other automated tray placement mechanism (e.g., by source tray conveyors 217 and/or output tray conveyors 219), or manually by an operator. One or more alignment features may facilitate correct positioning of the source tray 280 and the output tray 290 within the tray content transfer system 200. Alignment features may include, for example, one or more mechanical stops located on or adjacent to the source tray sub-frame 216 and/or the output tray sub-frame 218, and/or may include source tray conveyors 217 and/or output tray conveyors 219 moving automatically to correctly position the source tray 280 and the output tray 290. The paddle assembly 250 is located above the source tray 280 with the paddles 252 in an open configuration. The item support platform 230 is in a disengaged position away from the source tray sub-frame 216 and the output tray sub-frame 218 so as not to impede placement of the source tray 280 and the output tray 290.

In an example tray content transfer process, the source tray 280 is an item-containing rigid plastic automation-friendly tray including various features optimized for transfer of the items 205 between various letter or flats processing machinery located elsewhere. The example output tray 290 is a corrugated plastic postal letter tray for the transportation of letter mail or flats. The items 205 stacked within the source tray 280 are to be transferred to the output tray 290. In some embodiments, the items 205 may already be uniformly faced (that is, selectively flipped such that the postage and address of each item in the stack faces the same direction). Thus, it is desirable for the tray content transfer process to maintain the uniform facing of the items 205 during transfer.

Figure 4:
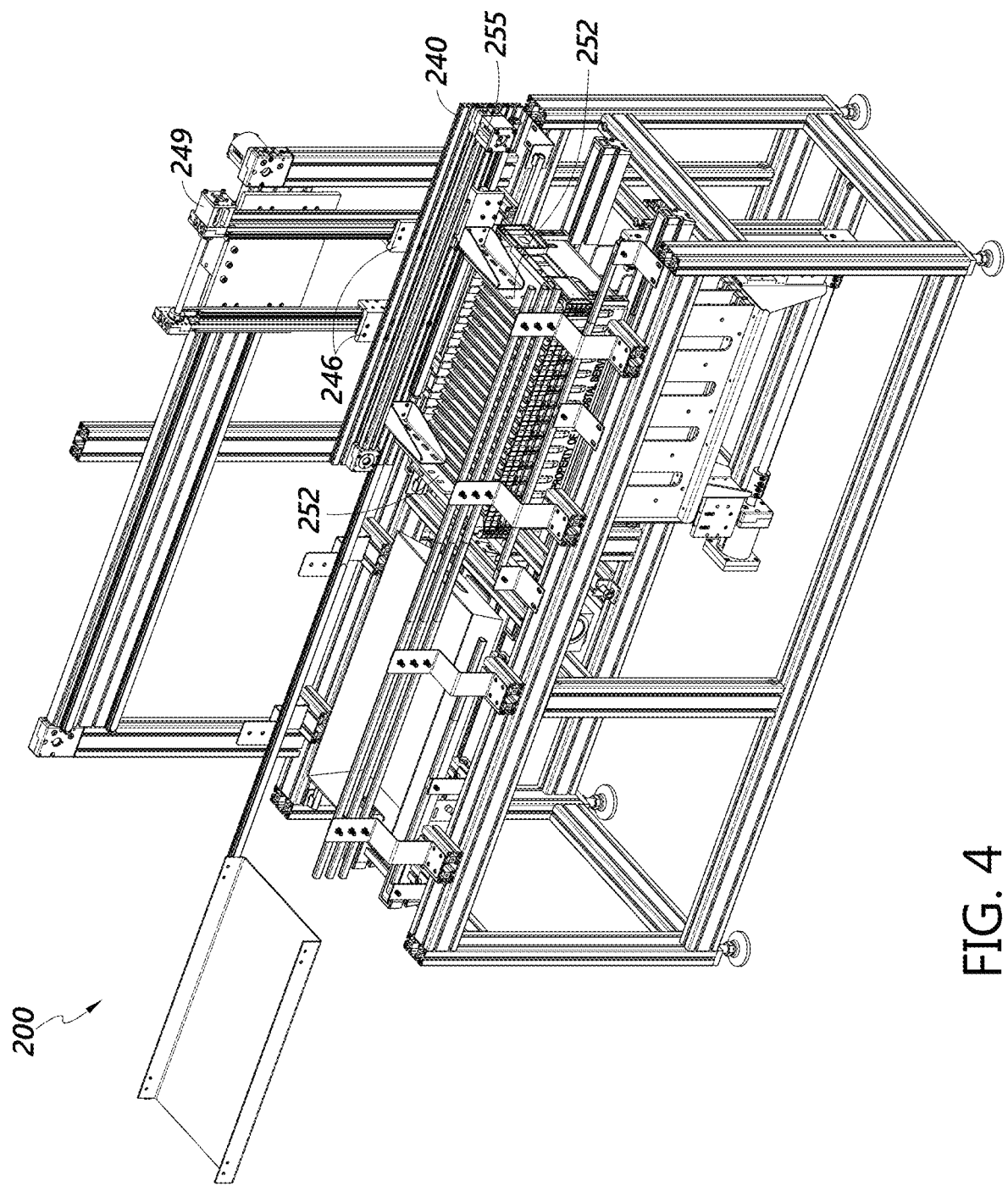
FIG. 4 is a perspective view of a second state of the tray content transfer system of FIG. 3 during the example tray content transfer process of FIG. 3.

After the item-containing source tray 280 and the empty output tray 290 are placed within the tray content transfer system 200, the process continues to the configuration shown in FIG. 4. As shown in FIG. 4, the vertical translation platform 246 slides downward along the axis 247, along the vertical track members 248 such that the paddle assembly 250 moves downward along the axis 247 to a location partially within the source tray 280. The paddles 252 of the paddle assembly 250 are spaced such that the paddle fingers 254 of each paddle 252 descend into one of the empty spaces between the items 205 and an interior sidewall of the source tray 280 created by the spacers 284 (shown in FIG. 2C). The lower ends of the paddle fingers 254 can descend to a position at or near the bottom of the source tray 280 (e.g., within 1 inch, ½ inch, ¼ inch, or closer, or touching the bottom of the source tray 280). Thus, in the state shown in FIG. 4, the stack of items 205 is disposed between the two paddles 252. In some embodiments, one or both of the paddles 252 can be moved inward along axis 253 to compress the stack of items 205, causing the items 205 to move to a more vertical orientation. In compressing the stack, the paddles 252 may push the items 205 toward the middle of the source tray 280 and away from the ends, creating a space between the items 205 and the interior sidewalls of the source tray 280. In various embodiments, the inward distance traveled by a paddle 252 can be, for example, ½ inch, 1 inch, 2 inches, 3 inches, 4 inches, or more.

Figure 5:
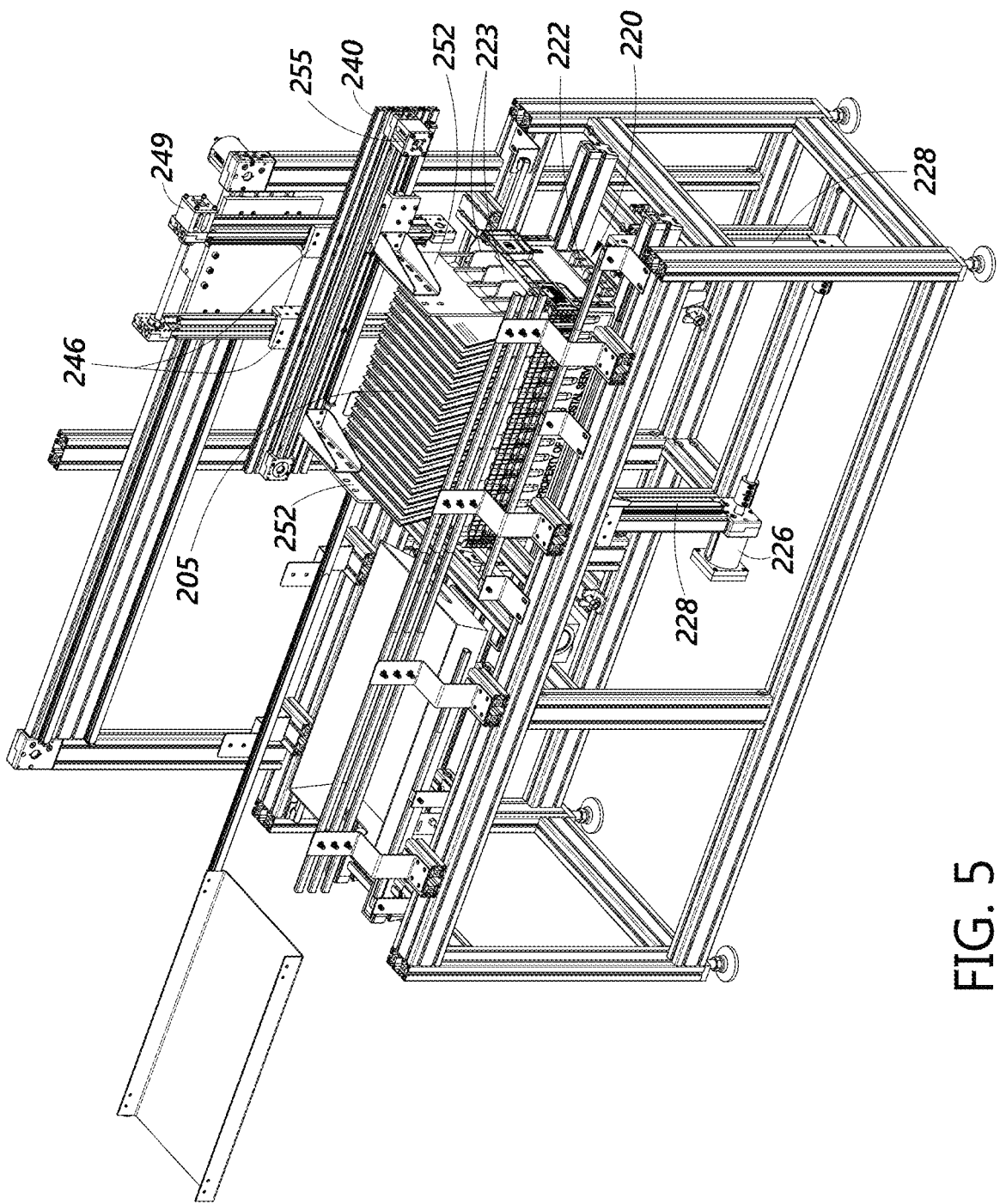
FIG. 5 is a perspective view of a third state of the tray content transfer system of FIG. 3 during the example tray content transfer process of FIGS. 3-4.

After the paddle assembly 250 is lowered into the source tray 280 and has compressed the stack of items 205, the process continues to the configuration shown in FIG. 5. As shown in FIG. 5, the lifting assembly 220 and the paddle assembly 250 have moved upward in unison along the axes 225 and 247, respectively. As the lifting assembly 220 moves upward, the fingers 222 enter the slots 282 in the bottom of the source tray 280. The tips 223 of the fingers 222 impinge on the bottom surfaces of one or more of the items 205 in the source tray 280, and push, force, urge, or otherwise elevate the items 205 upward such that the items 205 rest on the tips 223. In some embodiments, the fingers 222 can move together to lift or move the stack of items 205 in the same plane. In some embodiments, the fingers 222 can move sequentially, at different rates, to different heights, and the like. For example, the fingers at one end may move to a higher point or different point than others of the fingers 222. Although the fingers 222 include a plurality of separate members, the perpendicular orientation of the items 205 relative to the fingers 222 allows the tips 223 to serve as a suitable support for the items 205. In some embodiments, the source tray 280 may further include a movable floor configured to be pushed upward by the fingers 222, or by some other similar mechanism, such that the items 205 rest on the raised movable floor rather than directly on the tips 223 of the fingers 222. In the state shown in FIG. 5, the items 205 are substantially confined between the paddles 252, the tips 223 of the fingers 222 of the lifting assembly 220, and the rails 211, at a position higher than the sidewalls of the source tray 280 and the output tray 290.

After the lifting assembly 220 and the paddle assembly 250 move upward to lift the stack of items 205 out of the source tray 280, the process continues to the configuration shown in FIG. 6. As shown in FIG. 6, the item support platform 230 has been translated along axis 231 on the track 232 to a position above the source tray 280. In translating to the position of FIG. 6, a leading edge of the item support platform 230 may pass between the tips 223 of the fingers 222 and the lower extremities of the paddle fingers 254. Lower portions of the items 205 may deform slightly and/or items 205 may shift upward slightly to accommodate passage of the item support platform 230 between the finger tips 223 and the paddle fingers 254. In the state shown in of FIG. 6, the items 205 now rest on the horizontally slidable item support platform 230, rather than on the tips 223 of the fingers 222 which are only vertically translatable. Thus, the configuration of FIG. 6 is a slidable configuration that permits the items 205 to be moved to the output tray 290. In some embodiments, the paddles 252 can compress the stack of items 205 and lift the items up a small amount to accommodate the passage of the item support platform 230 between the bottom surfaces of the items and the tips 223 of the fingers 222. In some embodiments, the fingers 222 can sequentially retract a small amount to accommodate passage of the item support platform 230. For example, the fingers 222 on the side closest to the item support platform 230 can retract, either fully, or a small amount, as the item support platform 230 nears or contacts those fingers 222. As the item support platform 230 continues, the next finger 222 or set of fingers 222 can retract, to further allow passage of the item support platform 230. This process can continue until the item support platform 230 is below the whole stack of items 205.

Figure 7:
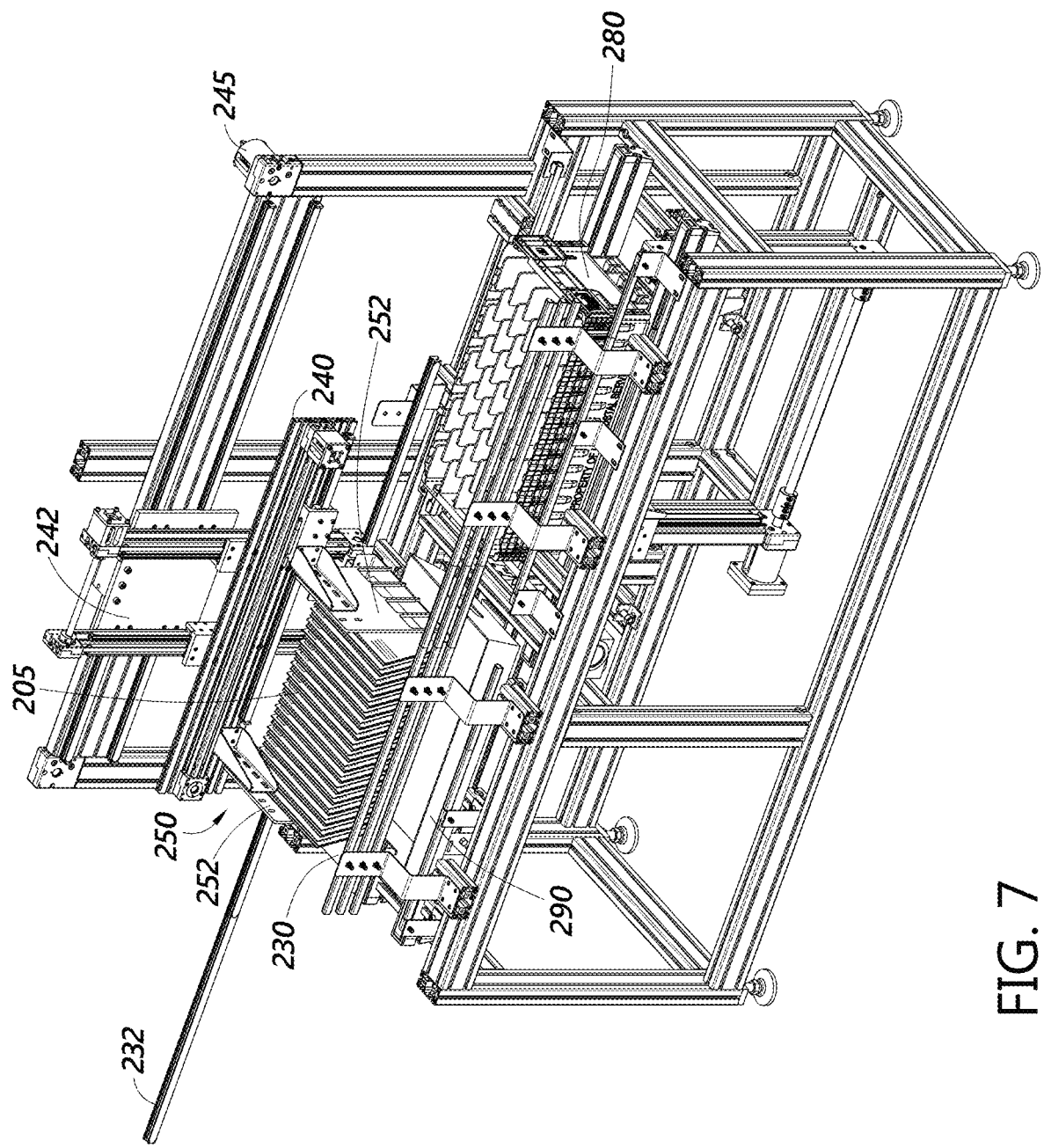
FIG. 7 is a perspective view of a fifth state of the tray content transfer system of FIG. 3 during the example tray content transfer process of FIGS. 3-6.

After the items 205 are placed in the configuration shown in FIG. 6, the process continues to the configuration shown in FIG. 7. As shown in FIG. 7, the horizontal translation platform 242 has been translated along the axis 241, along the horizontal track members 244, to move the paddle assembly 250 to a position above the output tray 290. At the same time, the item support platform 230 has been translated along the axis 231 to a position between the paddle assembly 250 and the output tray 290. The paddle assembly 250 and the item support platform 230 can move in unison such that the items 250 remain supported by the item support platform 230 as the paddles 252 move the items 205 laterally over the space, gap, or area between the source tray 280 and the output tray 290. In some embodiments, one or more sensors may be provided to indicate when the paddle assembly 250 is positioned above the output tray 290. This can prevent the items 205 from falling out of the transfer system and becoming damaged or lost.

Figure 8:
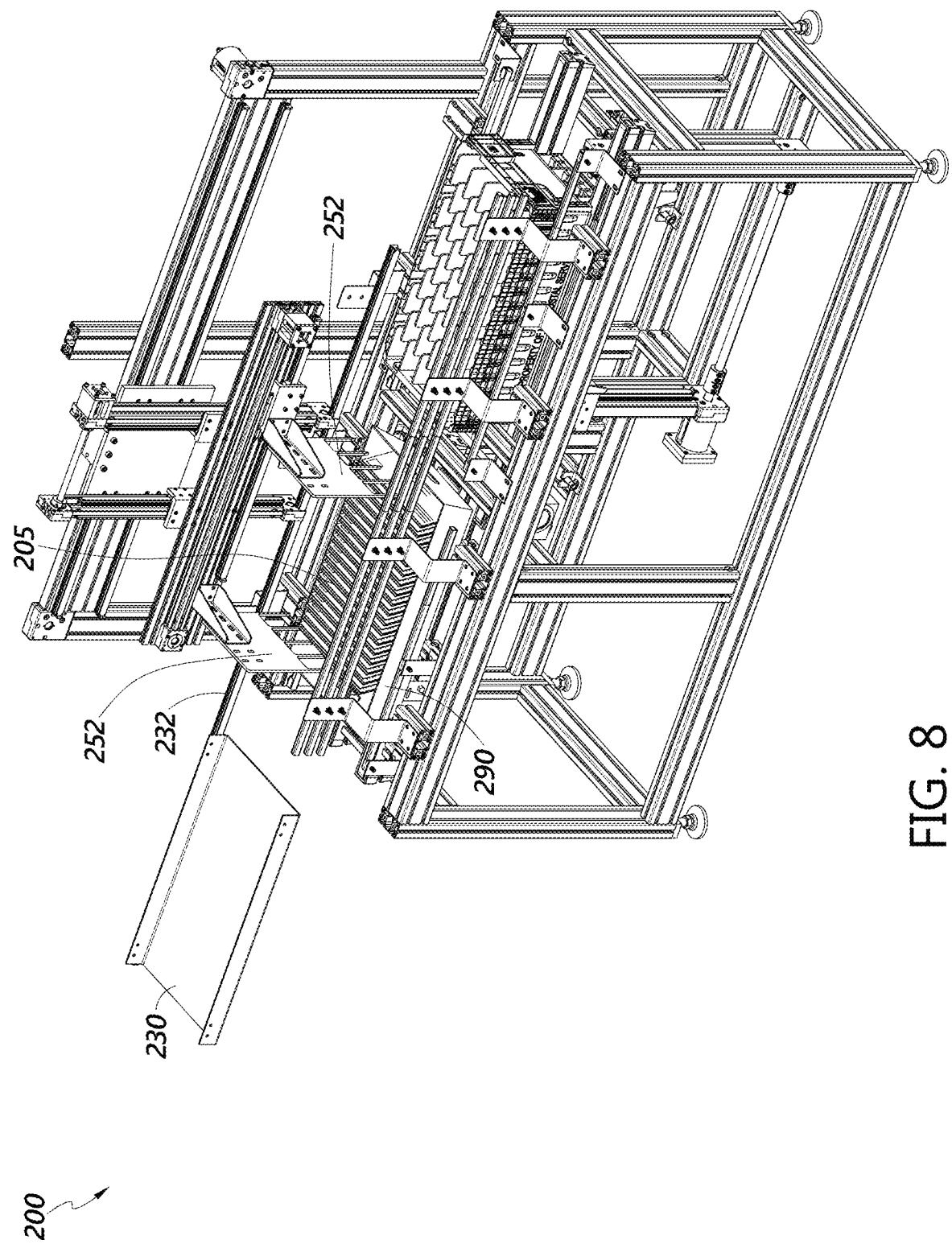
FIG. 8 is a perspective view of a sixth state of the tray content transfer system of FIG. 3 during the example tray content transfer process of FIGS. 3-7.

After translation of the items 205 to the position above the output tray 290 shown in FIG. 7, the process continues to the configuration shown in FIG. 8. As shown in FIG. 8, the item support platform 230 has been translated back to its initial disengaged position to release the items 205 into the output tray 290. In some embodiments, the item support platform 230 can instead return to a position above the source tray 280 to release the items 205. In some embodiments, e.g., where the item support platform 230 comprises two or more separable pieces, the items 205 may be released into the output tray 290 by separating the pieces of the item support platform 230 in a sliding or bomb bay door opening motion. As the item support platform 230 retracts, friction between a top surface of the item support platform 230 and the bottom surfaces of one or more of the items can impart a force on one or more of the items, or on the entire stack. By moving downward, the paddles 252 continue to provide lateral support for the stack of items 205 against such a frictional force, preventing the items 205 from moving laterally with the item support platform 230. The items fall down into the output tray 290. In some embodiments, the paddles 252 can lower as the item support platform 230 retracts in order to ensure the items fall down into the output tray 290, and do not fall or move too far laterally, missing the output tray 290. In the configuration of FIG. 8, the items 205 have been transferred to the output tray 290 and are generally resting on the bottom interior surface of the output tray 290. After the items 205 are released into the output tray 290, the process continues to the configuration shown in FIG. 9.

Figure 9:
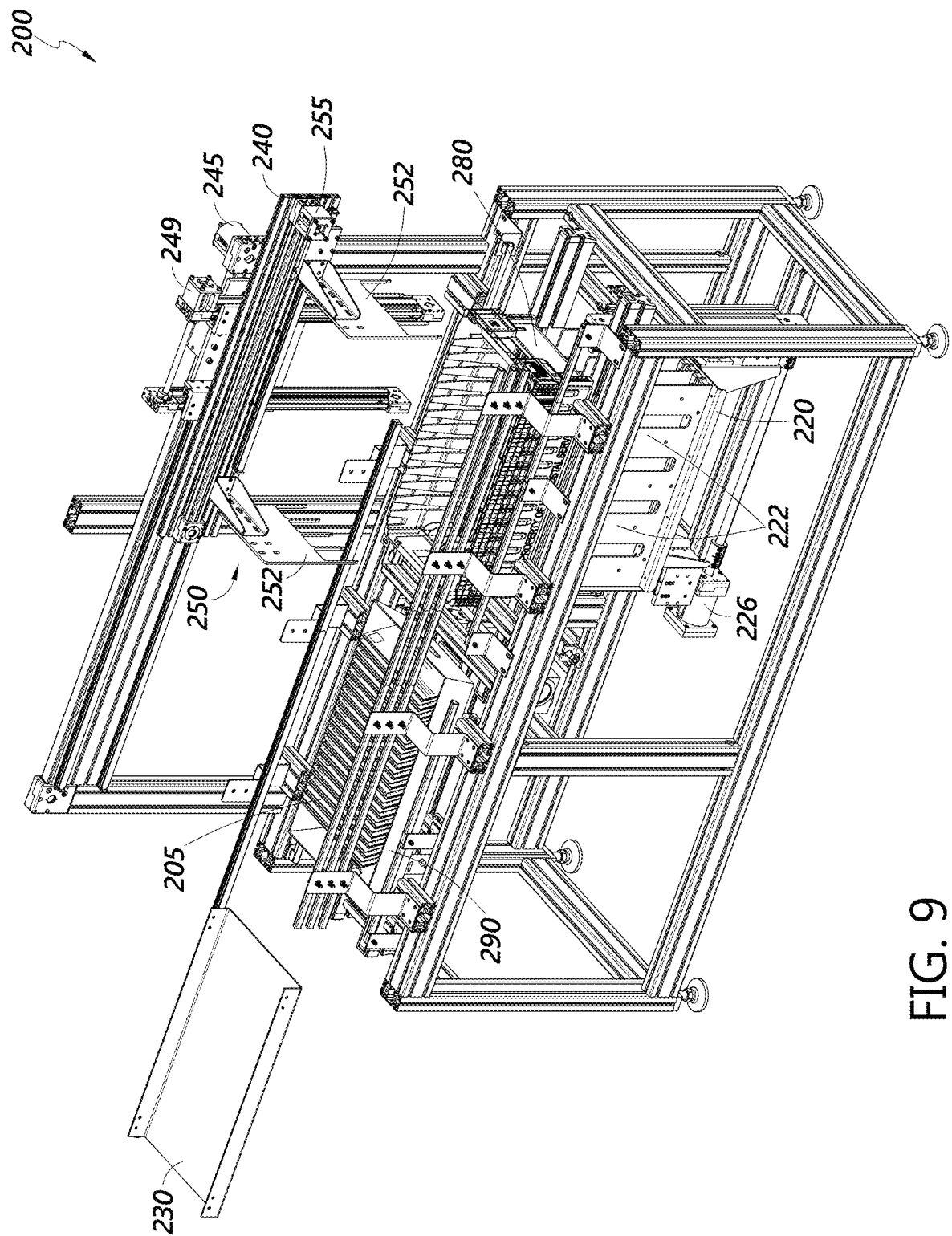
FIG. 9 is a perspective view of a seventh state of the tray content transfer system of FIG. 3 during the example tray content transfer process of FIGS. 3-8.

Continuing to FIG. 9, the horizontal translation platform 242 returns to its initial state, and the now empty source tray 280 and the now occupied output tray 290 can be removed. The horizontal paddle assembly motor 245 and the vertical paddle assembly motor 249 move the paddle assembly 250 back to its initial position above the source tray 280 as shown in FIG. 3. The lifting assembly motor 226 moves the lifting assembly downward such that the fingers 222 are retracted from the slots 282 of the source tray 280. Accordingly, the now-empty source tray 280 and the process tray 290 containing the items 205 can be removed from the tray content transfer system 200, and the tray content transfer process can be repeated indefinitely as additional source trays 280 arrive with contents to be transferred.

Figure 10A:
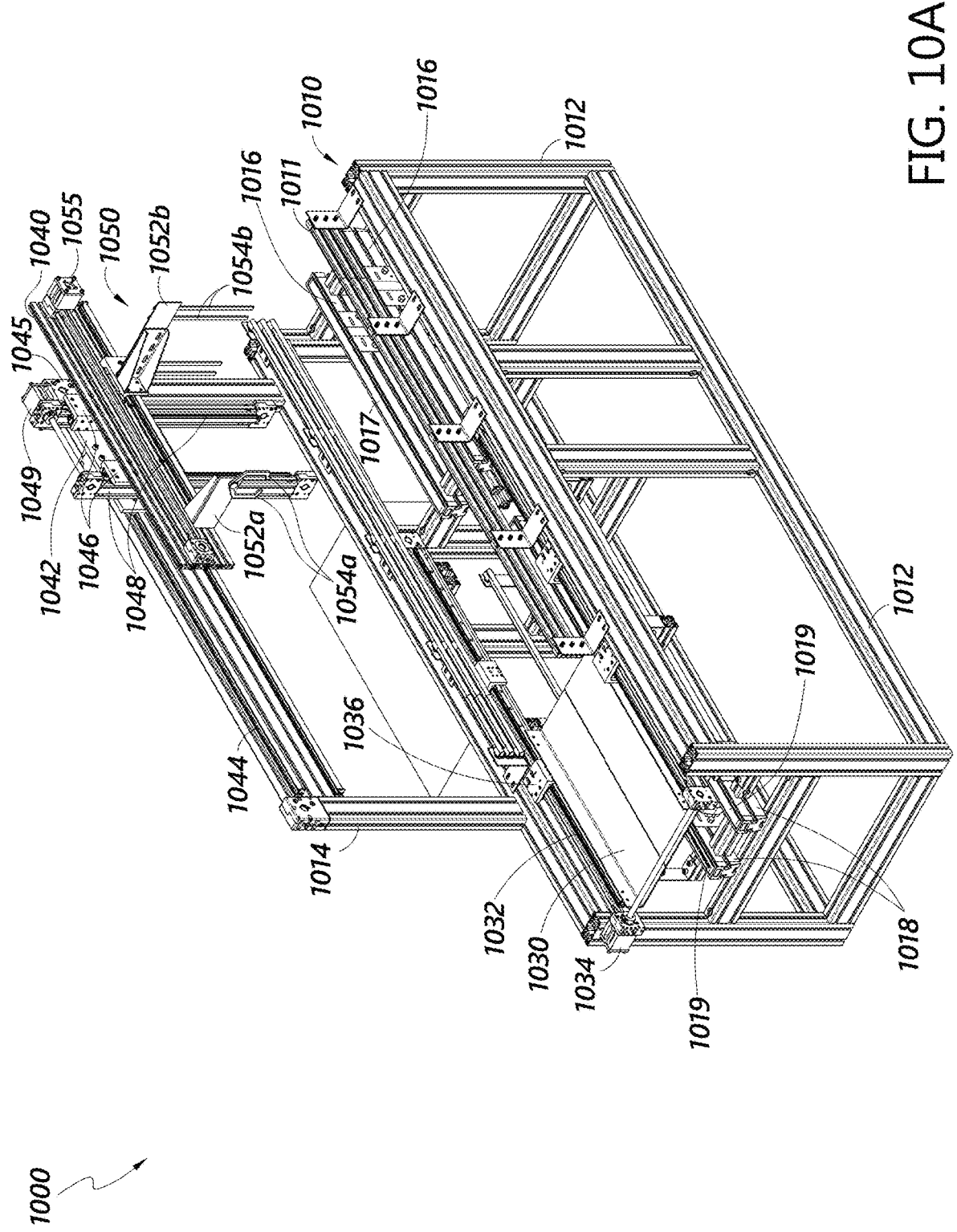
FIG. 10A is a front perspective view of an example tray content transfer system.
Figure 10B:
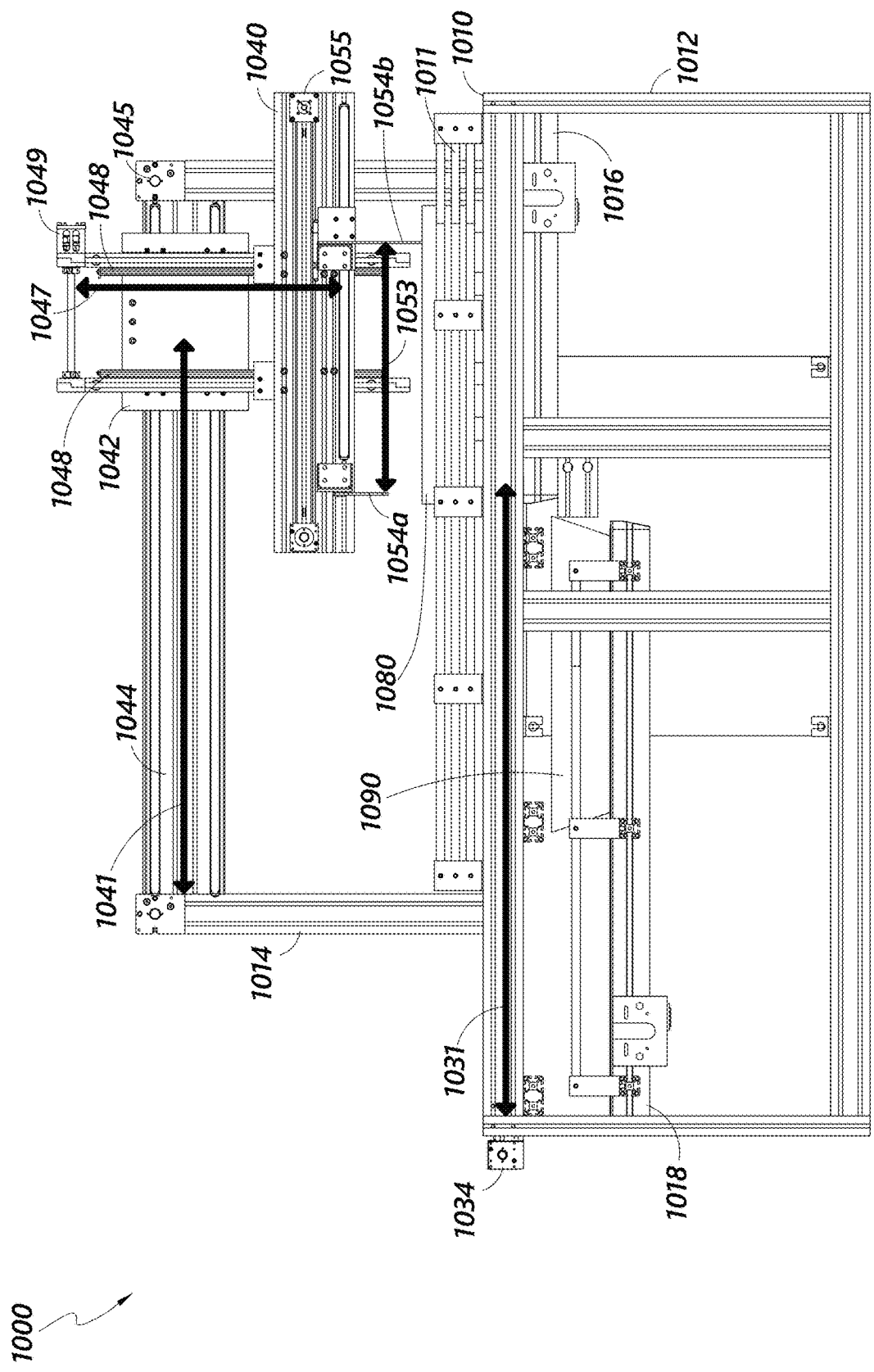
FIG. 10B is a front elevation view of the tray content transfer system of FIG. 10A showing the axes of motion of the tray content transfer system.
Figure 10C:
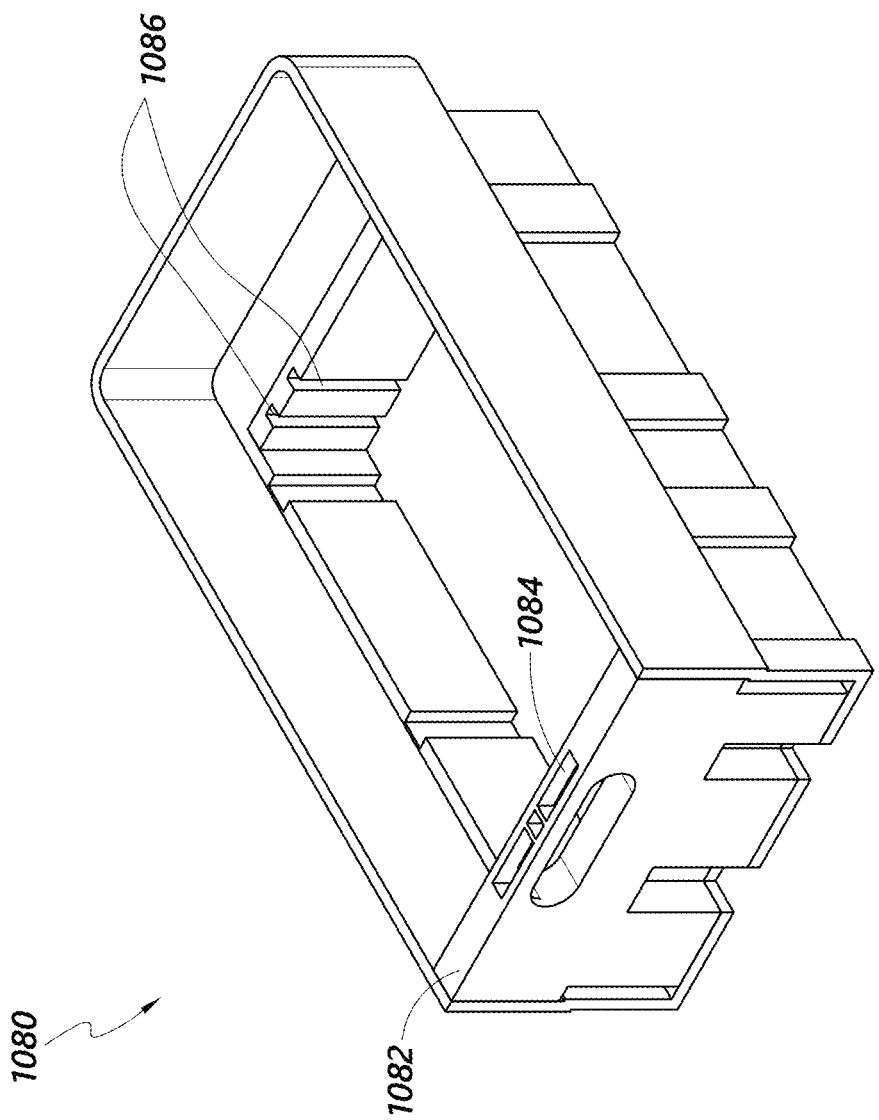
FIG. 10C is a perspective view of an example source tray compatible with the tray content transfer system of FIGS. 10A and 10B.

FIGS. 10A and 10B depict a further example embodiment of a tray content transfer system 1000. FIG. 10A is a front perspective view of the tray content transfer system 1000 in an empty state. FIG. 10B is a front elevation view of the tray content transfer system 1000 containing a source tray 1080 and an output tray 1090, illustrating four axes of motion within the tray content transfer system 1000. FIG. 10C depicts an example source tray 1080 compatible with the tray content transfer system 1000. The tray content transfer system 1000 generally includes a frame 1010, an item support platform 1030, and a paddle assembly 1050 movably mounted above the frame 1010.

The frame 1010 is generally configured to provide a stable support for the sliding platform 1030 and the paddle assembly 1050. The frame 1010 includes various structural members 1012 arranged to form a substantially rigid frame structure, upper frame members 1014, a source tray sub-frame 1016, an output tray sub-frame 1018, and one or more rails 1011 positioned to laterally confine items being transferred. In the example tray content transfer system 1010, the output tray sub-frame 1018 is disposed at a lower height relative to the source tray sub-frame 1016, such that the top of an output tray 1090 resting on the output tray sub-frame 1018 is at or below the level of the floor of a source tray 1080 resting on the source tray sub-frame 1016. In some embodiments, the source tray sub-frame 1016 includes one or more source tray conveyors 1017 configured to slide a source tray 1080 when the source tray 1080 is at least partially on the source tray conveyors 1017. The output tray sub-frame 1018 may similarly include one or more output tray conveyors 1019 configured to slide an output tray 1090 when the output tray 1090 is at least partially on the output tray conveyors 1019. The source tray conveyors 1017 and the output tray conveyors 1019 may be reversible, for example, so that they can travel in a first direction before a transfer to pull a source tray 1080 and/or an output tray 1090 from an external conveyor system (e.g., an automated tray transport system or the like) into a suitable position within the tray content transfer system 1000, and can travel in a second direction after completing a transfer to push the source tray 1080 and/or the output tray 1090 back out to the external conveyor system. In various embodiments, the frame 1010 can be any size, shape, or configuration suitable to support the various components of the tray content transfer system 1000. For example, the frame 1010 can be built into a wall, a shelf, a floor, or the like, and need not be a free-standing rectangular frame as shown in the figures.

The upper frame members 1014 of the frame 1010 are generally configured to support and accommodate motion of a paddle assembly base 1040 to which the paddle assembly 1050 is mounted. A horizontal translation platform 1042 is slidably mounted to a horizontal track member 1044 disposed on the upper frame members 1014, to accommodate horizontal movement of the paddle assembly 1050. A vertical translation platform 1046 is slidably mounted to two vertical track members 1048 of the horizontal translation platform 1042 to accommodate vertical movement of the paddle assembly 1050. Movement of the horizontal translation platform 1042 along the horizontal track member 1044 and movement of the vertical translation platform 1046 along the vertical track members 1048 can occur independently, and may be controlled by one or more motors, such as a horizontal paddle assembly motor 1045 and a vertical paddle assembly motor 1049.

Figure 14:
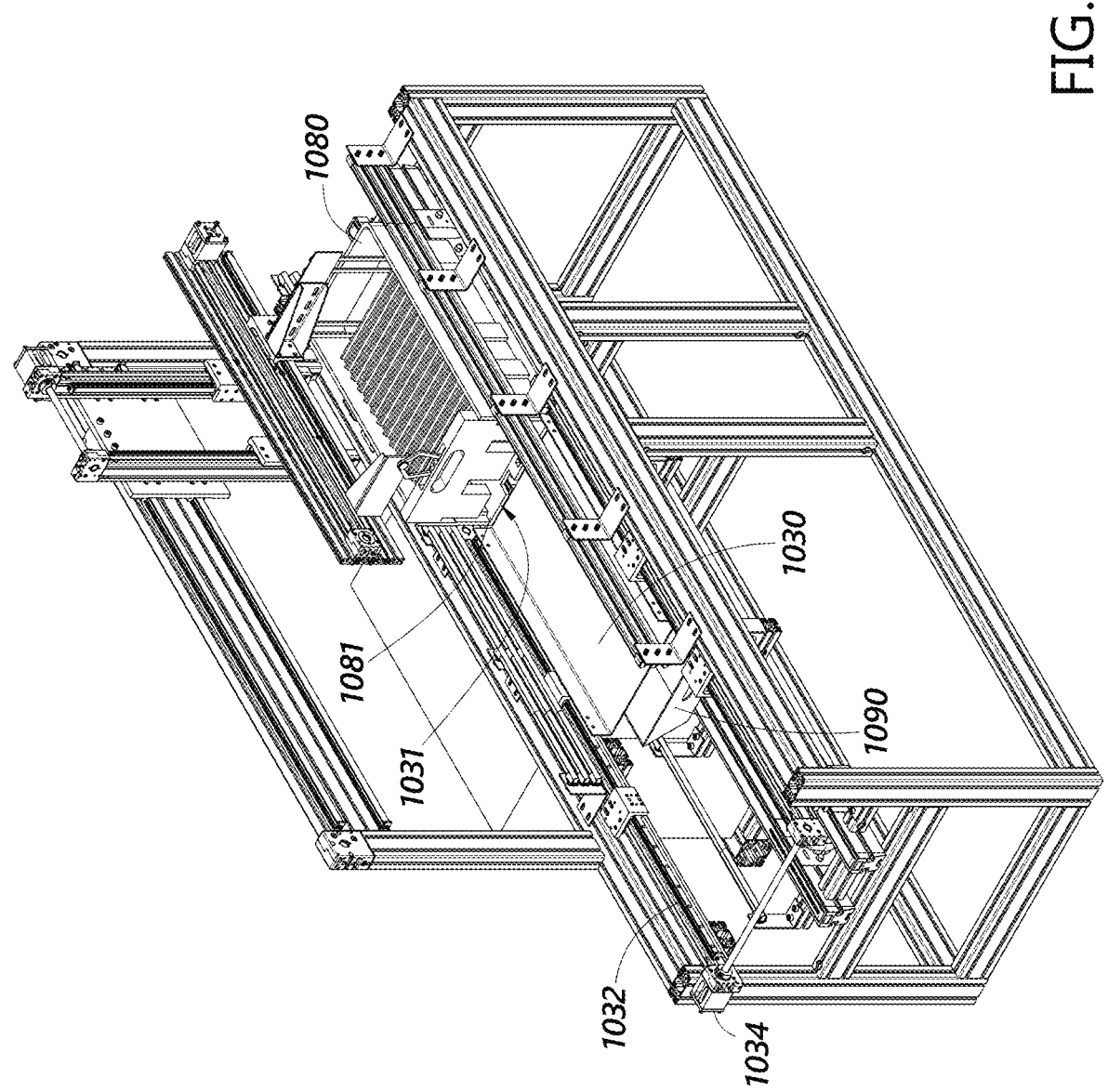
FIG. 14 is a perspective view of a fourth state of the tray content transfer system of FIG. 11 during the example tray content transfer process of FIGS. 11-13.

The item support platform 1030 is configured to move horizontally along a track 1032 disposed above the source tray sub-frame 1016 and the output tray sub-frame 1018. The item support platform 1030 is mounted to the track 1032 by item support platform sliders 1036 and is movable along the track 1032 by an item support platform motor 1034. The track 1032 may be mounted at an appropriate height such that the item support platform 1030 can slide along the length of the track 1032 unobstructed while an output tray 1090 is located within the tray content transfer system 1000. For example, in some embodiments the item support platform 1030 is disposed at a predetermined height such that the item support platform 1030 is at approximately the level of the source tray sub-frame 1016. The track 1032 may provide a sufficient range of motion for the item support platform 1030 such that the item support platform 1030 can slide between a first extreme position (e.g., the disengaged position as shown in FIG. 10A in which the item support platform 1030 is not above the portion of the output tray sub-frame 1018 adjacent to the source tray sub-frame 1016), and a second extreme position (e.g., the position as shown in FIG. 14 in which the item support platform 1030 is adjacent to the source tray sub-frame 1016). In some embodiments, the item support platform 1030 may comprise two or more pieces that are movable relative to each other. For example, the item support platform 1030 may comprise two halves divided along a dimension of the item support platform 1030 such that the item support platform 1030 can open by rotating in a "bomb bay doors" configuration or by sliding outwardly.

The paddle assembly 1050, as shown in FIGS. 10A-10B, includes two paddles 1052*a* and 1052*b*. Paddle 1052*a* includes grippers 1054*a* configured to grasp, release, disengage, and/or otherwise actuate an end wall of a compatible source tray, as described below with reference to FIG. 10C. Paddle 1052*b* includes downwardly extending paddle fingers 1054*b*. The paddle assembly 1050 can be made of any substantially rigid material, for example, a metal such as sheet aluminum or steel, a hard plastic, or the like. One or more of the paddles 1052*a*, 1052*b* are slidably mounted on the paddle assembly base 1040. A paddle motor 1055 may slide the paddles 1052*a*, 1052*b* to increase or decrease the distance between the paddles 1052*a*, 1052*b*. Each paddle 1052*a*, 1052*b* is a generally planar surface disposed perpendicular to the paddle assembly base 1040.

FIG. 10C illustrates an example source tray 1080 compatible with the tray content transfer system 1000. The source tray 1080 includes a detachable sidewall 1082. The detachable sidewall 1082 may lock or latch to the source tray 1080, and may be unlockable by engaging the grippers 1054*a* within openings 1084 in a center portion of the top of the detachable sidewall 1082. The paddle fingers 1054*b* of paddle 1052*b* can be sized and shaped to fit within corresponding grooves 1086 of the source tray 1080 which are disposed closer to the sidewalls of the source tray 1080 than the center of the source tray 180, such that all items within the source tray 1080 can be contained between the paddle fingers 1054*b* and the detachable sidewall 1082 when the paddle assembly 1050 is lowered into the source tray. In various embodiments, the paddles 1052*a*, 1052*b* can have other sizes and/or shapes to conform with source trays 1080 of any size or shape.

With reference to FIG. 10B, the components described above with reference to FIGS. 10A-10C can move along various axes with reference to the frame 1010. The paddles 1052*a*, 1052*b* of the paddle assembly 1050 can be moved along several axes. Horizontal translation along a paddle assembly horizontal axis 1041 can be achieved by moving the horizontal translation platform 1042 along the horizontal track member 1044 under control of the horizontal paddle assembly motor 1045. Vertical translation along a paddle assembly vertical axis 1047 can be achieved by moving the vertical translation platform 1046 along the vertical track members 1048 under control of the vertical paddle assembly motor 1049. Squeezing of the paddles 1052*a*, 1052*b* along a paddle motion axis 1053 can be achieved by moving one or both paddles 1052*a*, 1052*b* by the paddle motor 1055. The item support platform motor 1034 can move the item support 1030 along an item support axis 1031. A combination of movements along axes 1031, 1041, 1047, and 1053 can be used to transfer items from the source tray 1080 to the process tray 1090.

Referring generally to FIGS. 10A and 10B, motion of any of the moving parts described herein, for example, horizontal translation along axes 1031, 1041, and 1053, and/or vertical translation along axis 1047, can be driven by any number of motors, and can be selectively controlled and/or inhibited by mechanical brakes configured to stop and/or prevent motion along any of the movement axes described herein. The motors and/or brakes can be controlled by one or more controllers, which may include computer components such as one or more processors, memory or other storage media, network or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence. The predetermined sequence can include, for example, a tray content transfer process such as the process described below with reference to FIGS. 11-17.

FIGS. 11-17 sequentially illustrate an example process for transferring the contents of a source tray 1080 to an output tray 1090. Although the process of FIGS. 11-17 is shown and described in the context of the tray content transfer system 1000 depicted in FIGS. 10A and 10B, it will be appreciated that the same or similar steps may be implemented in any other tray content transfer system.

Figure 11:
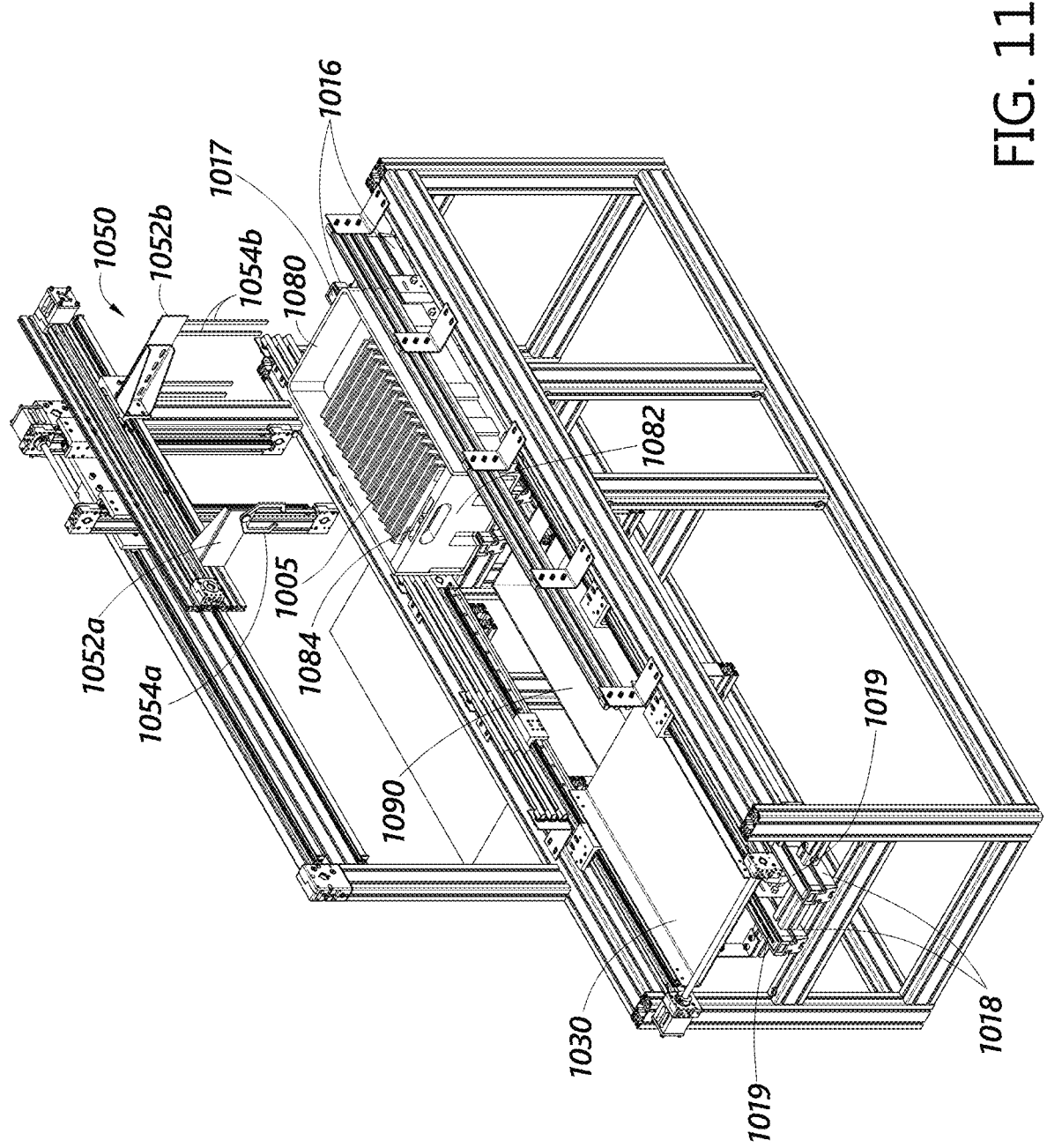
FIG. 11 is a perspective view of an initial state of a tray content transfer system during an example tray content transfer process.

FIG. 11 depicts an initial state of the tray content transfer process. In the initial state, a source tray 1080 contains items 1005. The items can be, for example, letters, flats, etc. In the initial state of FIG. 11, the source tray 1080 has been placed onto the source tray sub-frame 1016 in a position below the paddle assembly 1050. An empty output tray 1090 has been placed in the output tray sub-frame 1018 spaced from and lower than the source tray 1080 to receive the items 1005 through the tray content transfer process. As described above with reference to FIG. 11, the source tray 1080 and the output tray 1090 may have been placed in their respective locations manually or automatically, for example, being placed into the tray content transfer system 1000 by one or more conveyors, rollers, ramps, robotic arms, paddles, pushers, or other automated tray placement mechanism (e.g., by source tray conveyors 1017 and/or output tray conveyors 1019). One or more alignment features may facilitate correct positioning of the source tray 1080 and the output tray 1090 within the tray content transfer system 1000. Alignment features may include, for example, one or more mechanical stops located on or adjacent to the source tray sub-frame 1016 and/or the output tray sub-frame 1018, and/or may include source tray conveyors 1017 and/or output tray conveyors 1019 moving automatically to correctly position the source tray 1080 and the output tray 1090. The paddle assembly 1050 is located above the source tray 1080 with the paddles 1052*a*, 1052*b* in an open configuration. The item support platform 1030 is in a disengaged position away from the source tray sub-frame 1016 so as not to impede placement of the source tray 1080 and the output tray 1090.

In the example tray content transfer process, the source tray 1080 is a rigid plastic automation-friendly or automation-compatible tray including various features optimized for transfer of the items 1005 between various letter or flats processing machinery located elsewhere. The example output tray 1090 is a corrugated plastic postal letter tray for the transportation of letter mail or flats. The items 1005 stacked within the source tray 1080 are to be transferred to the output tray 1090. In some embodiments, the items 1005 may already be uniformly faced (that is, selectively flipped such that the postage and address of each item in the stack faces the same direction). Thus, it is desirable for the tray content transfer process to maintain the uniform facing of the items 1005 during transfer.

Figure 12:
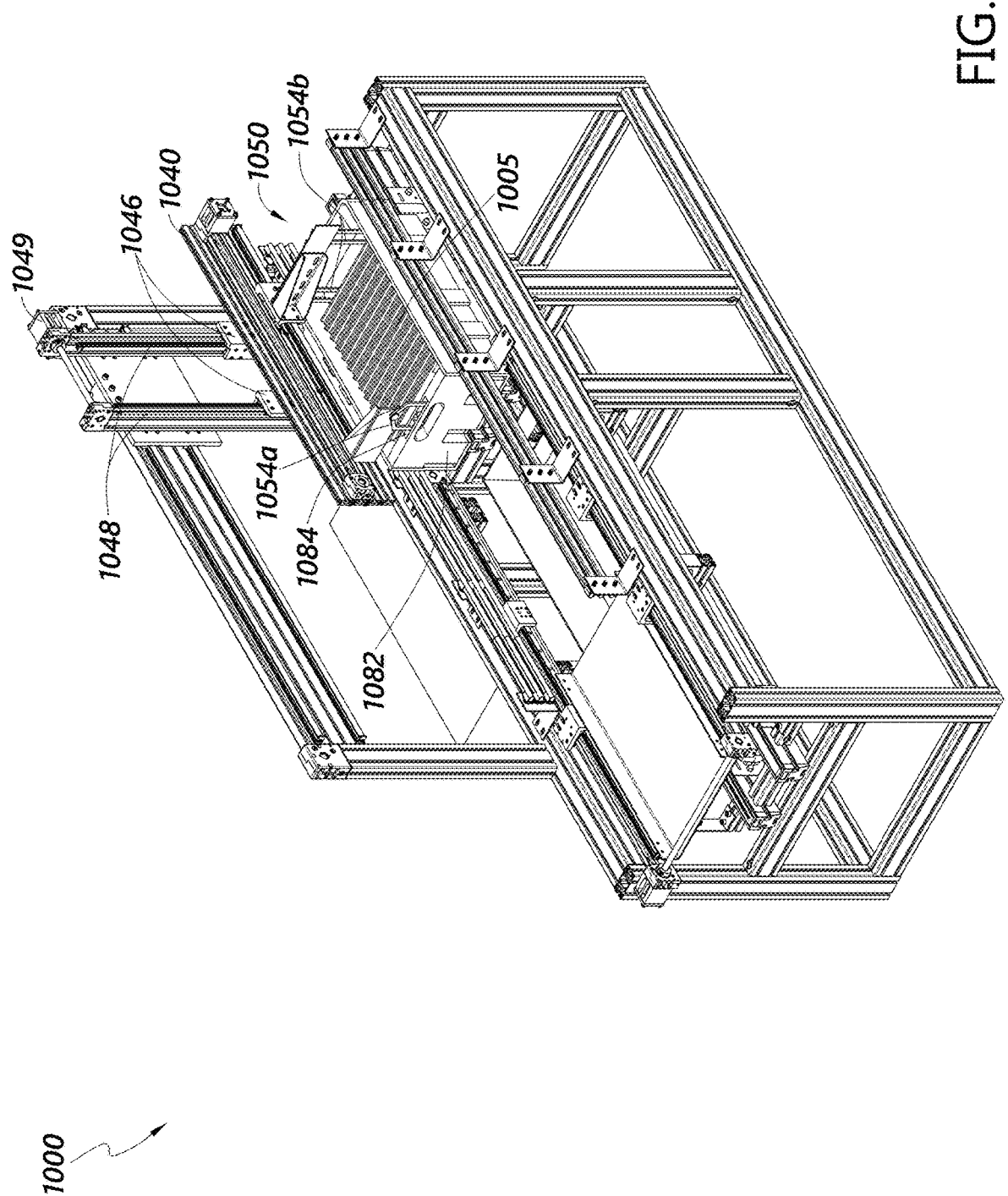
FIG. 12 is a perspective view of a second state of the tray content transfer system of FIG. 11 during the example tray content transfer process of FIG. 11.

After the source tray 1080 and the output tray 1090 are placed within the tray content transfer system 1000, the process continues to the configuration shown in FIG. 12. As shown in FIG. 12, the vertical translation platform 1046 slides downward along the axis 1047, along the vertical track members 1048 such that the paddle assembly 1050 moves downward along the axis 1047 to a location partially within the source tray 1080. The paddles 1052*a*, 1052*b* of the paddle assembly 1050 are spaced such that the grippers 1054*a* of paddle 1052*a* descend into the openings 1084 in the top of the detachable sidewall 1082 and the paddle fingers 1054*b* descend into the grooves 1086 (shown in FIG. 10C). The lower ends of the paddle fingers 1054*b* can descend to a position at or near the bottom of the source tray 1080 (e.g., within 1 inch, ½ inch, ¼ inch, or closer, or touching the bottom of the source tray 1080). Thus, in the state shown in FIG. 12, the stack of items 1005 is disposed between the paddle fingers 1054*b* and the detachable sidewall 1082. In some embodiments, paddle 1052*b* can be moved inward along axis 1053 to compress the stack of items 1005, causing the items 1005 to move to a more vertical orientation. In various embodiments, the inward distance traveled by paddle 1052*b* can be, for example, ½ inch, 1 inch, 2 inches, 3 inches, 4 inches, or more.

Figure 13:
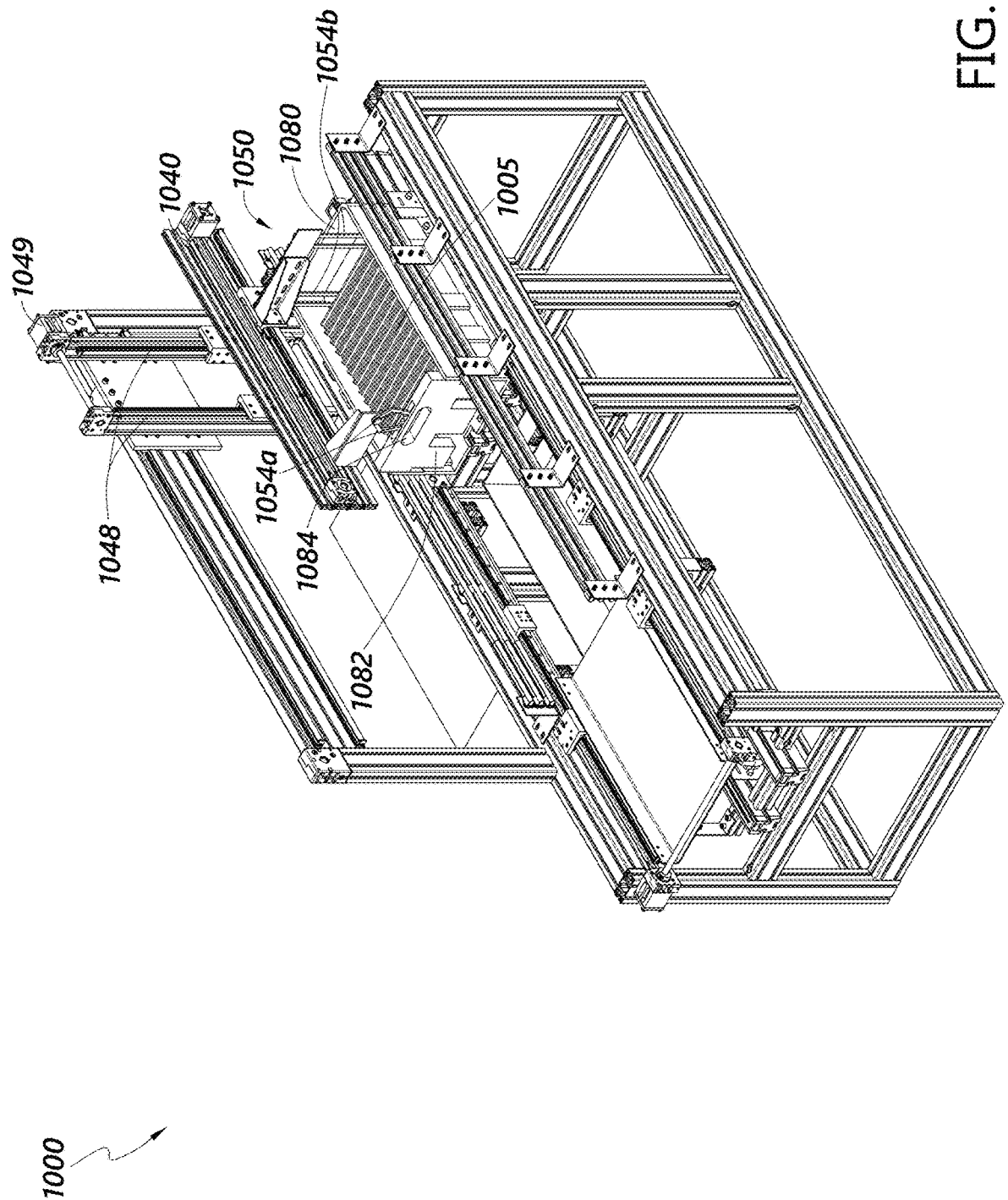
FIG. 13 is a perspective view of a third state of the tray content transfer system of FIG. 11 during the example tray content transfer process of FIGS. 11-12.

After the paddle assembly 1050 is lowered into the source tray 1080, the process continues to the configuration shown in FIG. 13. As shown in FIG. 13, the grippers 1054*a* have detached the detachable sidewall 1082, and the paddle assembly 1050 has traveled upward to lift the detachable sidewall 1082 above the floor of the source tray 1080. The upward distance traveled by the paddle assembly 1050 may be, for example, approximately ¼ inch, ½ inch, 1 inch, or more. In the state shown in FIG. 13, the items 1005 are substantially confined between the paddle fingers 1054*b*, the floor of the source tray 1080, and the detachable sidewall 1082 of the source tray 1080.

After the paddle assembly 1050 moves upward to partially lift the detachable sidewall 1082 of the source tray 1080, the process continues to the configuration shown in FIG. 14. As shown in FIG. 14, the item support platform 1030 has been translated along axis 1031 by the item support platform motor 1034 to a position above the output tray 1090. In translating to the position of FIG. 14, a leading edge of the item support platform 1030 travels to a position adjacent to or slightly beneath an end of the source tray 1080. The item support platform 1030 at least partially covers the output tray 1090 and provides a surface nearer to the height of the floor of the source tray 1080 such that the stack of items 1005 can slide onto the item support platform 1030 without falling into the output tray 1090. Thus, the configuration of FIG. 14 is a slidable configuration that permits the items 1005 to be moved to the output tray 1090.

Figure 15:
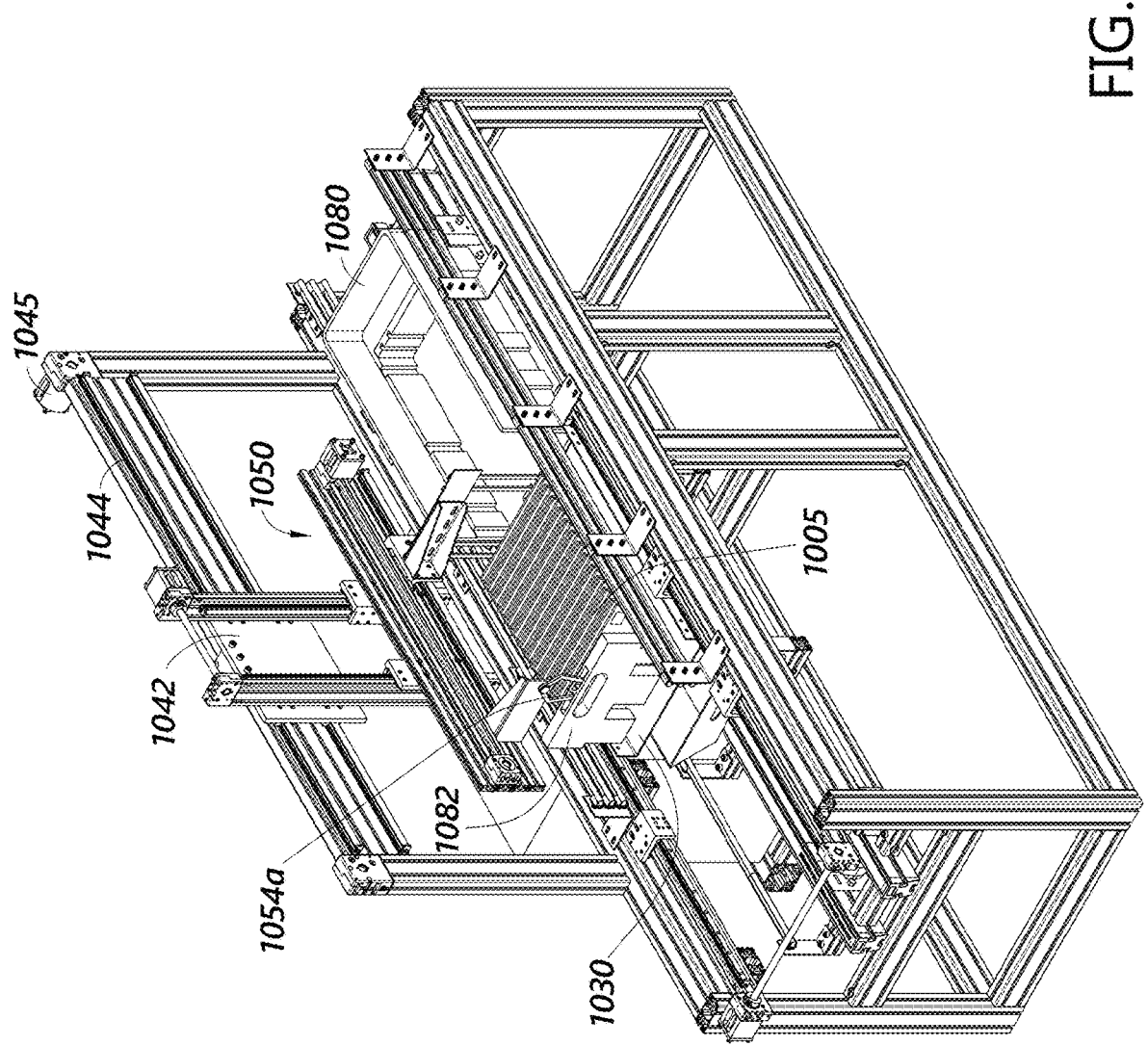
FIG. 15 is a perspective view of a fifth state of the tray content transfer system of FIG. 11 during the example tray content transfer process of FIGS. 11-14.

After the items 1005 are placed in the slidable configuration of FIG. 14, the process continues to the configuration shown in FIG. 15. As shown in FIG. 15, the horizontal translation platform 1042 has been translated along the axis 1041, along the horizontal track members 1044, to move the paddle assembly 1050 to a position above the output tray 1090. As the paddle assembly 1050 moves, the items 1005 contained within the paddle assembly 1050 slide in a stack onto the item support platform 1030. Due to the presence of the item support platform 1030, any downward movement of the items 1005 is not sufficient to cause any of the items 1005 to fall out from between the detachable sidewall 1082 and the paddle fingers 1054*b*. Thus, the items 1005 in FIG. 15 are retained in a position above the output tray 1090.

Figure 16:
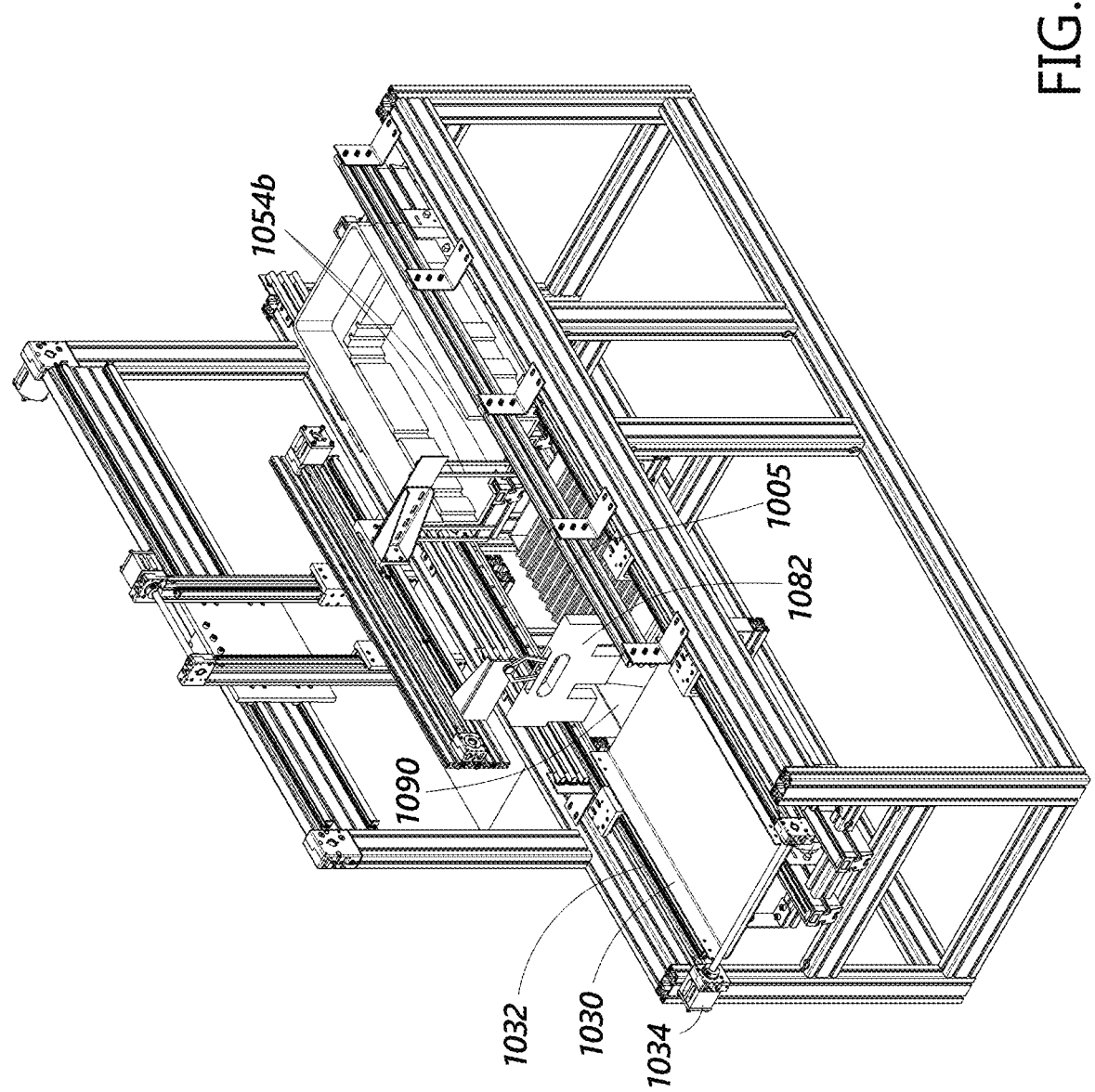
FIG. 16 is a perspective view of a sixth state of the tray content transfer system of FIG. 11 during the example tray content transfer process of FIGS. 11-15.

After translation of the items 1005 to a position above the output tray 1090, the process continues to the configuration shown in FIG. 16. As shown in FIG. 16, the item support platform 1030 has been translated back to its initial disengaged position to release the items 1005 into the output tray 1090. In some embodiments, e.g., where the item support platform 1030 comprises two or more separable pieces, the items 1005 may be released into the output tray 1090 by separating the pieces of the item support platform 1030 in a sliding or bomb bay door opening motion. In the configuration of FIG. 16, the items 1005 have been transferred to the output tray 1090 and are generally resting on the bottom interior surface of the output tray 1090. After the items 1005 are released into the output tray 1090, the process continues to the configuration shown in FIG. 17.

Figure 17:
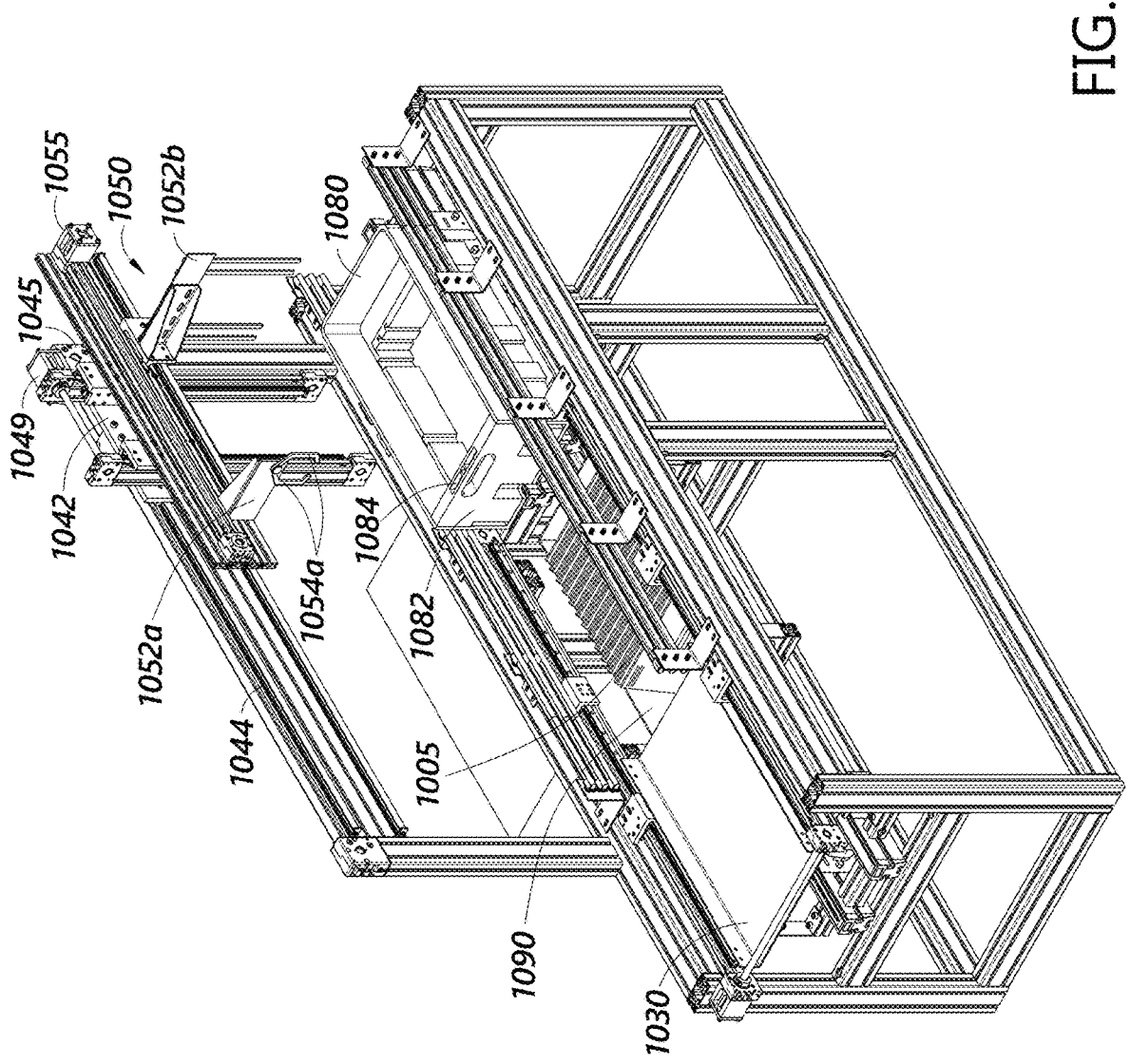
FIG. 17 is a perspective view of a seventh state of the tray content transfer system of FIG. 11 during the example tray content transfer process of FIGS. 11-16.

Continuing to FIG. 17, the paddle assembly 1050 returns to its initial state such that the now-empty source tray 1080 and the now-occupied output tray 1090 can be removed, either automatically or manually. The horizontal paddle assembly motor 1045 and the vertical paddle assembly motor 1049 move the paddle assembly 1050 back to its initial position above the source tray 1080 as shown in FIG. 11. The detachable sidewall 1082 is released from the grippers 1054*a* and can be placed back into its initial position within the source tray 1080. Accordingly, the now-empty source tray 1080 and the process tray 1090 containing the items 1005 can be removed from the tray content transfer system 1000, and the tray content transfer process can be repeated indefinitely as additional source trays 1080 arrive with contents to be transferred.

Figure 18:
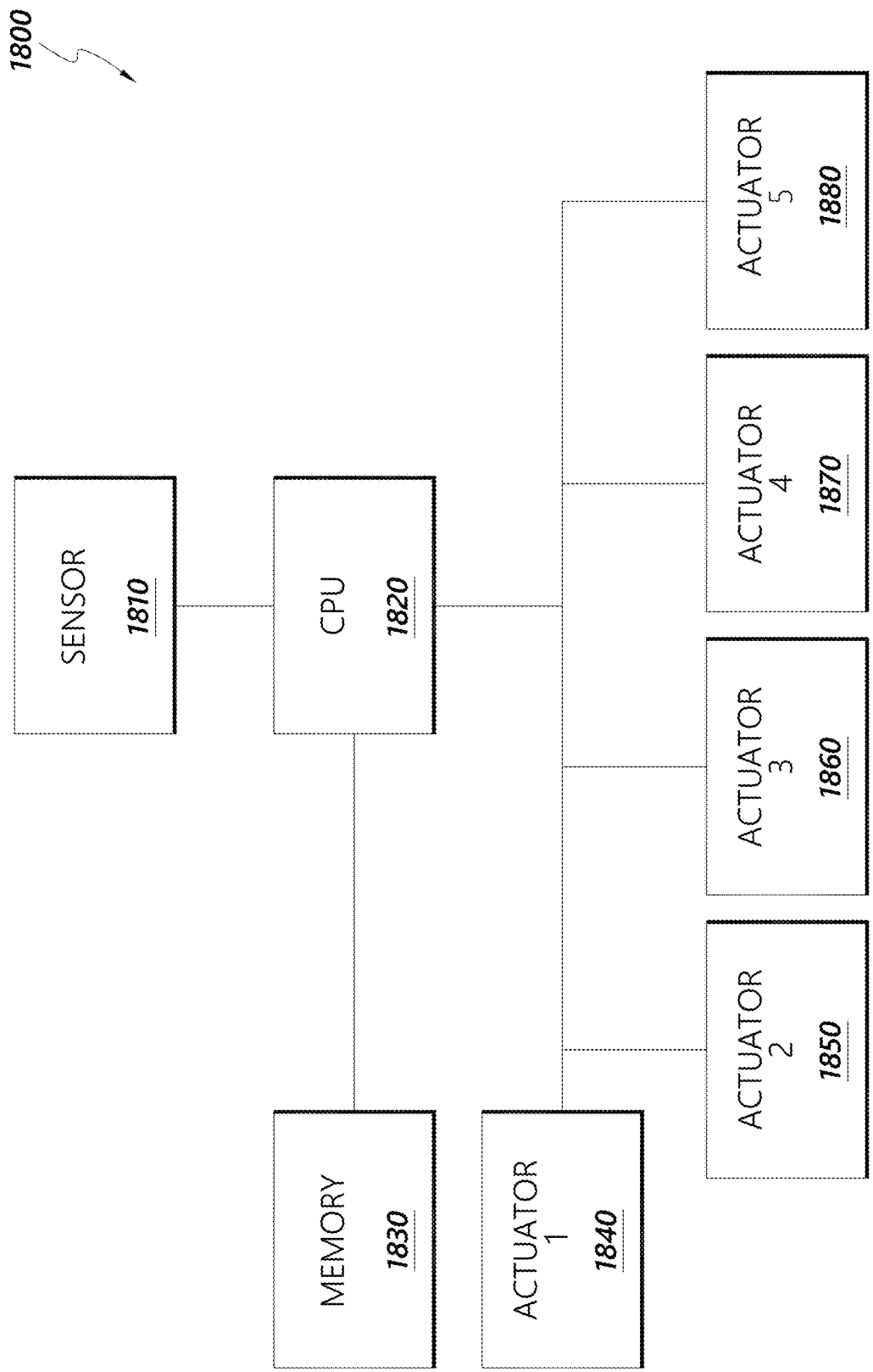
FIG. 18 is a block diagram of a tray content transfer system.

FIG. 18 is a block diagram of a tray content transfer system 1800 in accordance with an example embodiment. The system 1800 includes a sensor 1810 in communication with a CPU 1820. The CPU 1820 is further in communication with a memory 1830 and actuators including actuator 1840, actuator 1850, actuator 1860, actuator 1870, and actuator 1880. Although the system 1800 is depicted as having 5 actuators, the number of actuators in various embodiments can be greater or smaller than 5, for example, based on the number of parts to be moved in any particular embodiment of the system 1800.

The sensor 1810 is configured to detect the presence of one or more containers or other objects within the system 1800. For example, the sensor 1810 can be configured to detect the presence of a source tray and/or an output tray before initiating a transfer process. In various implementations, the sensor 1810 can include one or more proximity sensors, profile sensors, pressure sensors, force sensors, scales, cameras, optical pattern recognition devices such as barcode scanners, light gates, or the like. In some embodiments, the sensor 1810 can include a manually activated device, such as a button, configured to produce a signal indicating that a source tray and an output tray have been loaded into the system 1800. In some embodiments, the sensor 1810 can include a first sensor configured to detect the presence of a source tray and a second sensor configured to detect the presence of a process tray.

The CPU 1820 is configured to control and receive input from the sensor 1810, the memory 1830, and the actuators 1840, 1850, 1860, 1870, 1880. The memory 1830 can store data received from the CPU 1820 and send data stored therein to the CPU 1820. Examples of information that may be received and stored in the memory 1830 include, for example, information received at the CPU 1820 from the sensor 1810, information received at the CPU from the actuators 1840, 1850, 1860, 1870, 1880, and one or more computer-executable instructions that, when executed by the CPU 1820, cause the CPU to selectively activate and/or deactivate the actuators 1840, 1850, 1860, 1870, 1880, 1890 in a predetermined sequence to transfer items from a source tray to an output tray.

The actuators 1840, 1850, 1860, 1870, 1880 can be electronically controllable actuators each coupled to and configured to move one or more mechanical components of the system 1800. Each actuator 1840, 1850, 1860, 1870, 1880 can include one or more electric motors, hydraulic cylinders, pneumatic actuators, screw jacks, servos, solenoids, or the like. In the example tray content transfer system 200 depicted in FIGS. 2A-2B, the actuators may be arranged such that actuator 1840 corresponds to the lifting assembly motor 226, actuator 1850 corresponds to the horizontal paddle assembly motor 245, actuator 1860 corresponds to the vertical paddle assembly motor 249, actuator 1870 corresponds to the paddle motor 255, and actuator 1880 is configured to slide the item support platform 230 along axis 231 on the track members 231. In the example tray content transfer system 1000 depicted in FIGS. 10A and 10B, the actuators may be arranged such that actuator 1840 corresponds to the horizontal paddle assembly motor 1045, actuator 1850 corresponds to the vertical paddle assembly motor 1049, actuator 1860 corresponds to the paddle motor 1055, actuator 1870 corresponds to the item support platform motor 1034, and actuator 1880 is configured to actuate the grippers 1054a to grasp and release the detachable sidewall 1082 of the source tray 1080.

Figure 19:
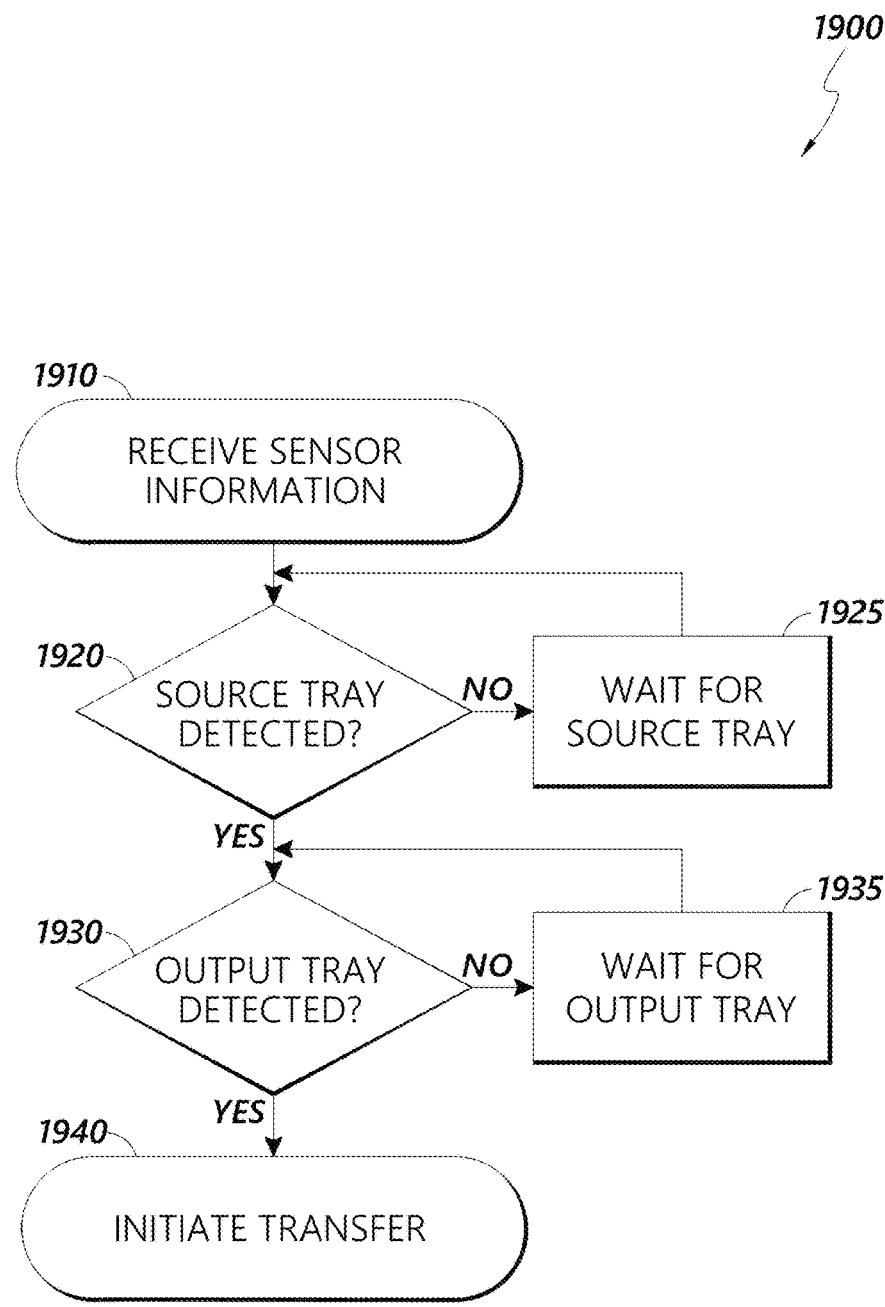
FIG. 19 is a flowchart illustrating an example method of initiating the transfer of items from a container.

FIG. 19 is a flowchart illustrating an example method 1900 of initiating the transfer of items from a container. The method 1900 can be performed by a computer system integrated within a system such as the tray content transfer systems 105, 200, 1000, 1800 depicted in FIGS. 2A-18. Although the method 1900 is described with reference to the tray content transfer system 1800, it may equally be performed within any of the tray content transfer systems described herein.

The method 1900 begins with block 1910, where the system 1800 begins receiving information from the sensor 1810. The information can be an electrical signal indicating that a source tray and/or an output tray have or have not been detected within the system 1800. When the system 1800 has begun receiving information from the sensor 1810, the method 1900 continues to decision state 1920.

At decision state 1920, it is determined whether a source tray has been detected. For example, the CPU 1820 can analyze a signal received from the sensor 1810 configured to detect the presence of a source tray within the system 1800 at a suitable location for transferring items from the source tray. If it is determined that a source tray has not been detected, the method 1900 continues to block 1925, where the system 1800 waits for a source tray to be detected and returns to decision state 1920. If it is determined that a source tray has been detected, the method 1900 continues to decision state 1930.

At decision state 1930, it is determined whether an output tray has been detected. For example, the CPU 1820 can analyze a signal received from the sensor 1810 configured to detect the presence of an output tray within the system 1800 at a suitable location for receiving items transferred from the source tray. If it is determined that an output tray has not been detected, the method 1900 continues to block 1935, where the system 1800 waits for an output tray to be detected and returns to decision state 1930. If it is determined that an output tray has been detected, the method 1900 continues to block 1940. At block 1940, the method 1900 terminates by initiating the transfer of items from the source tray to the output tray.

Figure 20:
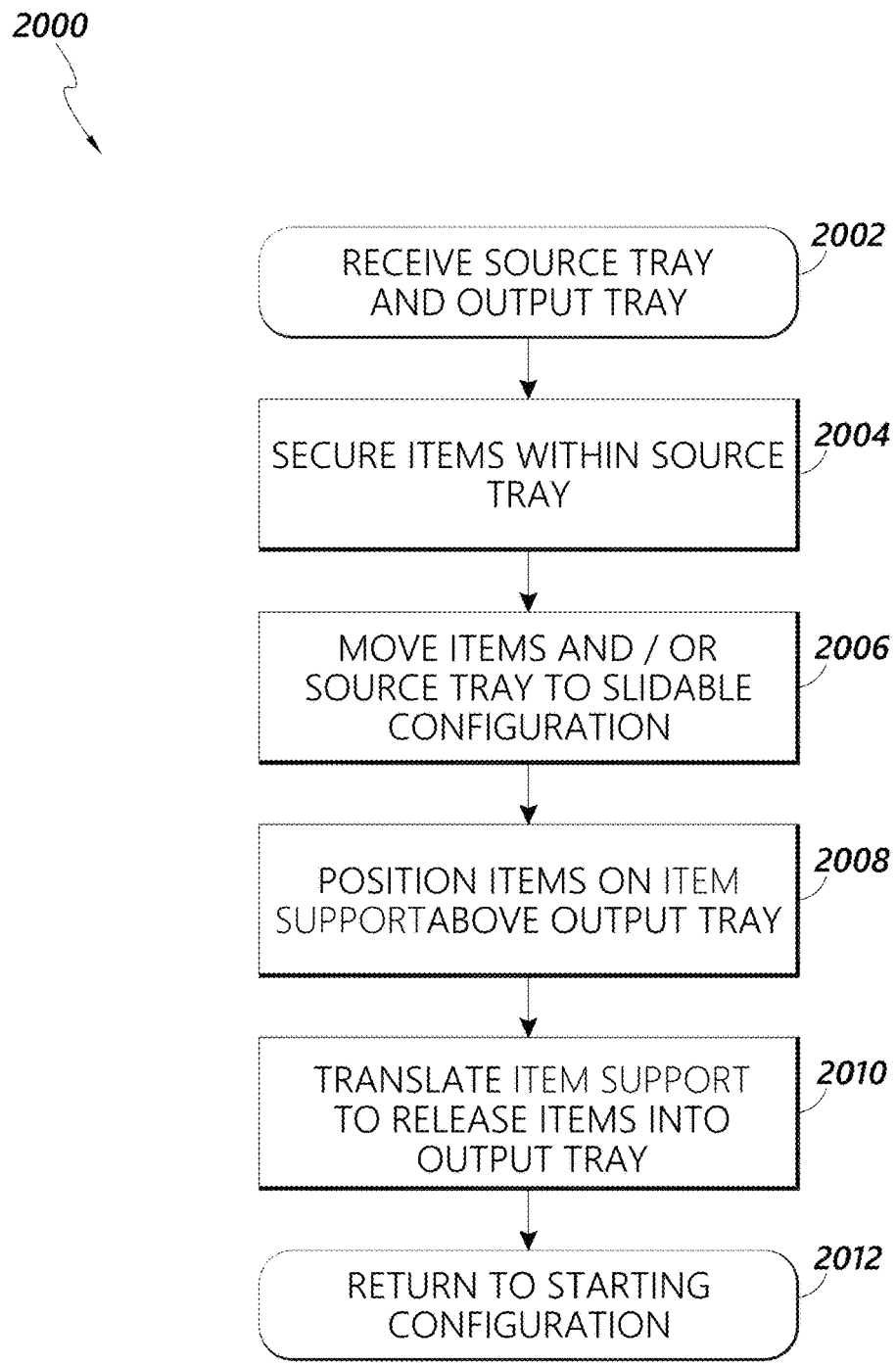
FIG. 20 is a flowchart illustrating an example method of transferring items from a source tray to an output tray in a tray content transfer system.

FIG. 20 is a flowchart illustrating an example method 2000 of transferring items from a source tray to an output tray in a tray content transfer system. The method 2000 can be initiated at block 1940 of the method 1900 depicted in FIG. 19. The method 2000 can be performed by a computer integrated within a tray content transfer system such as the systems 200, 1000, and 1800 depicted in FIGS. 2A-18.

The method 2000 begins at block 2002, where the source tray 280, 1080 and output tray 290, 1090 are received within the tray content transfer system 200, 1000. Receiving the source tray 280, 1080 and the output tray 290, 1090 can include an operator placing the source tray 280, 1080 and/or the output tray 290, 1090. Receiving the source tray 280, 1080 and the output tray 290, 1090 may also include moving the source tray 280, 1080 and/or the output tray 290, 1090 into position on respective sub-frames by conveyors 217, 219, 1017, and/or 1019. After the source tray 280, 1080 and the output tray 290, 1090 are secured within the system 200, 1000, the method 2000 continues to block 2004.

At block 2004, the items 205, 1005 within the source tray 280, 1080 are secured. In the example system 200, the items 205 can be secured by moving the paddle assembly 250 downward into the source tray 280 and optionally moving one or both of the paddles 252 inward, such that the items 205 are engaged between the paddles 252 and/or the paddle fingers 254. In the example system 1000, the items 1005 can be secured by moving the paddle assembly 1050 downward into the source tray 1080 and optionally moving paddle 1052b inward, such that the items 1005 are engaged between the paddle fingers 1054b and the detachable sidewall 1082. The paddle assembly 250, 1050, and/or paddles 252, 1052b can be moved by actuators such as actuators 1840-1880, based on instructions provided by the CPU 1820. After the items 205, 1005 within the source tray 280, 1080 are secured, the method 2000 continues to block 2006.

At block 2006, the items 205, 1005 are placed into a slidable configuration by moving the items 205, 1005, the item support platform 230, 1030, and/or a portion of the source tray 280, 1080. In the example system 200, the items 205 can be placed into a slidable configuration by simultaneously raising the lifting assembly 220 and the paddle assembly 250, followed by sliding the item support platform 230 to a position beneath the items 205, as shown in FIGS. 4-6. In the example system 1000, the items 1005 can be placed into a slidable configuration by disengaging the detachable sidewall 1082 of the source tray 1080 and sliding the item support platform 230 to a position adjacent to or partially beneath the source tray 1080, as shown in FIGS. 12-14. After the items 205, 1005 are placed into a slidable configuration, the method 2000 continues to block 2008.

At block 2008, the items 205, 1005 are positioned above the output tray 290, 1090 by horizontal translation (e.g., sliding). In the example system 200, the items 205 can be positioned above the output tray 290 by laterally translating the paddle assembly 250 and the item support platform 230 simultaneously, such that the items 205 are carried to a position in which they rest on the item support platform 230 and are disposed directly above the output tray 290. In the example system 1000, the items 1005 can be positioned above the output tray by laterally translating the paddle assembly 1050, including the detachable sidewall 1082 held by the grippers 1054a, such that the items 1005 slide from the source tray 1080 onto the item support platform 1030 and are disposed directly above the output tray 1090. After the items 205, 1005 are positioned above the output tray 290, 1090 by horizontal translation, the method 2000 continues to block 2010.

At block 2010, the item support platform 230, 1030 is translated to release the items 205, 1005 into the output tray 290, 1090. In the example system 200, the item support platform 230 may be translated to a disengaged position or to its previous position above the source tray 280, causing the items 205 to fall into the output tray 290 as the items 205 are retained laterally and the item support platform 230 is moved away. Similarly, in the example system 1000, the item support platform 1030 may be translated to a disengaged position to cause the items 1005 to fall into the output tray 1090 as the items 1005 are retained laterally and the item support platform 1030 is moved away. After the items 205, 1005 are released into the output tray 290, 1090, the method 2000 continues to block 2012.

The method 2000 terminates at block 2012, where the tray content transfer system 200, 1000 returns to its starting configuration. In the example system 200, the lifting assembly 220 moves downward to return to its initial position, the paddle assembly 250 moves upward and returns to its initial position above the source tray sub-frame 216, and the item support platform 230 returns to the disengaged position if not already in the disengaged position. In the example system 1000, the paddle assembly 1050 moves upward and returns to its initial position above the source tray sub-frame 216, and releases the detachable sidewall 1082 of the source tray 1080, and the item support platform 1030 returns to its initial disengaged position if not already in the disengaged position. After the tray content transfer system 200, 1000 returns to its starting configuration, the method 2000 terminates. The source tray 280, 1080 and the output tray 290, 1090 can be removed from the system 200, 1000 manually or by one or more automated systems such as the conveyors 217, 219, 1017, and/or 1019.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A tray content transfer system comprising:
   a frame comprising:
      a first tray sub-frame coupled to the frame and configured to receive a first tray; and
      a second tray sub-frame coupled to the frame and configured to receive a second tray at a location spaced from the first tray along a longitudinal axis;
   a paddle assembly movably coupled to the frame, the paddle assembly comprising a plurality of paddles, wherein the distance between the paddles is adjustable to selectively engage and release one or more items in the first tray, and wherein the paddle assembly is movable relative to the frame along a first axis parallel to the longitudinal axis and moveable along a second axis perpendicular to the first linear axis;
   a lifting assembly movably coupled to the frame, the lifting assembly configured to lift the one or more items in the first tray by moving vertically along a third axis parallel to the second axis; and
   an item support platform movably coupled to the frame, the item support platform comprising a substantially planar surface movable along a fourth axis parallel to the first axis between a first position above the first tray sub-frame and a second position above the second tray sub-frame.

2. The tray content transfer system of claim 1, further comprising a controller configured to adjust the distance between the paddles, to move the paddle assembly along the first axis and the second axis, to move the lifting assembly along the third axis, and to move the item support platform along the fourth axis between a first position and a second position, in a predetermined sequence to transfer the one or more items from the first tray to the second tray, the predetermined sequence comprising:
   causing the paddle assembly to engage the one or more items within the first tray;
   moving the paddle assembly upward along the second axis and moving the lifting assembly upward along the third axis to a raised position in which the items are disposed higher than a top of the first tray;
   moving the item support platform to the first position such that the item support platform is disposed between the one or more lifting elements and the items;
   simultaneously moving the paddle assembly along the first axis and moving the item support platform along the fourth axis such that the item support platform is in the second position and the paddle assembly is disposed above the second tray; and
   moving the item support platform along the fourth axis away from the second position to release the one or more items into the second tray.

3. The tray content transfer system of claim 2, further comprising a sensor configured to detect the presence of the first tray or the second tray within the tray content transfer system, wherein a plurality of motors are configured to initiate the predetermined sequence based at least in part on detecting the presence of the first tray or the second tray.

4. The tray content transfer system of claim 1, wherein each paddle comprises a plurality of paddle fingers sized and shaped to enter one or more corresponding grooves within a sidewall of the first tray when the paddle assembly is lowered into the first tray.

5. The tray content transfer system of claim 1, further comprising one or more rails coupled to the frame parallel to the longitudinal axis at a height that retains the one or more items on the item support platform.

6. The tray content transfer system of claim 1, further comprising a conveyor coupled to the first tray sub-frame or the second tray sub-frame, the conveyor configured to move a first tray or a second tray along the frame parallel to the longitudinal axis.

7. The tray content transfer system of claim 1, wherein the item support platform is further movable along the fourth linear axis to a disengaged position in which the item support platform is disposed above neither the first tray nor the second tray.

8. The tray content transfer system of claim 1, wherein the substantially planar surface of the item support platform comprises two sections divided along a dimension parallel to the fourth axis, each of the two sections being rotatable about a rotation axis parallel to the fourth axis.

9. The tray content transfer system of claim 8, further comprising a controller configured to adjust the distance between the paddles, to move the paddle assembly along the first axis and the second axis, to move the lifting assembly along the third axis, and to move the item support platform along the fourth axis between a first position and a second position, in a predetermined sequence to transfer the one or more items from the first tray to the second tray, the predetermined sequence comprising:
   causing the paddle assembly to engage the one or more items within the first tray;
   moving the paddle assembly upward along the second axis and moving the lifting assembly upward along the third axis to a raised position in which the items are disposed higher than a top of the first tray;
   moving the item support platform to the first position such that the item support platform is disposed between the one or more lifting elements and the items;
   simultaneously moving the paddle assembly along the first axis and moving the item support platform along the fourth axis such that the item support platform is in the second position and the paddle assembly is disposed above the second tray; and
   rotating the two sections of the item support downward about the rotation axes to release the one or more items into the second tray.

10. The tray content transfer system of claim 1, wherein the lifting assembly comprises a plurality of fingers oriented parallel to the third axis, the plurality of fingers being shaped and located to fit within corresponding slots in a floor of the first tray.

11. The tray content transfer system of claim 10, wherein vertical movement of the lifting assembly is constrained by an uppermost position in which tips of the fingers are at a lower height relative to a height of the substantially planar surface of the item support platform.

12. The tray content transfer system of claim 11, wherein the tips of the fingers are lower than the substantially planar surface by a difference less than or equal to 1 inch when the lifting assembly is in the uppermost position.

13. The tray content transfer system of claim 10, wherein the lifting assembly is movable to a lowermost position in which the fingers are retracted from the slots in the floor of the first tray.

\* \* \* \* \*